United States Patent
Chen et al.

(10) Patent No.: US 11,556,218 B2
(45) Date of Patent: Jan. 17, 2023

(54) SENSOR INCLUDING A PLURALITY OF SUBSTRATES

(71) Applicant: Wacom Co., Ltd., Saitama (JP)

(72) Inventors: Yuanhao Chen, Saitama (JP); Yoshihisa Sugiyama, Saitama (JP); Akira Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/700,319

(22) Filed: Mar. 21, 2022

(65) Prior Publication Data

US 2022/0206605 A1 Jun. 30, 2022

Related U.S. Application Data

(63) Continuation of application No. 17/006,279, filed on Aug. 28, 2020, now Pat. No. 11,281,347, which is a continuation of application No. PCT/JP2018/008823, filed on Mar. 7, 2018.

(51) Int. Cl.
*G06F 3/046* (2006.01)
*G06F 3/041* (2006.01)
*G06F 3/0354* (2013.01)

(52) U.S. Cl.
CPC .......... *G06F 3/046* (2013.01); *G06F 3/03545* (2013.01); *G06F 3/04164* (2019.05)

(58) Field of Classification Search
CPC .. G06F 3/046; G06F 3/04164; G06F 3/03545; G06K 7/08; G01R 33/00; G01R 33/02
See application file for complete search history.

(56) References Cited

U.S. PATENT DOCUMENTS

| 7,307,616 B2 | 12/2007 | Katsuhito et al. |
| 2008/0225011 A1* | 9/2008 | Ito .......................... G06F 1/1643 345/173 |
| 2010/0321338 A1* | 12/2010 | Ely .......................... G06F 3/046 345/174 |

FOREIGN PATENT DOCUMENTS

| EP | 1 835 382 A2 | 9/2007 |
| EP | 1 835 382 A3 | 3/2012 |

(Continued)

OTHER PUBLICATIONS

Extended European Search Report, dated Feb. 11, 2021, for European Application No. 18908333.0-1231, 11 pages.

(Continued)

*Primary Examiner* — Lisa S Landis
(74) *Attorney, Agent, or Firm* — Seed IP Law Group LLP

(57) ABSTRACT

A sensor includes a first substrate on a back side of a display panel, a first coil extending in a first direction at a predetermined angle between 0 and 90 degrees with respect to a long-side direction of the first substrate and including a first long-side portion provided with first and second end portions, a second coil including a second long-side portion extending in a second direction, a first leader line including a first end and a second end, wherein the first end is connected to the first end portion, and the second end is connected to wiring on a second substrate arranged to extend at a right angle toward the outside of the sensor from one side of the first substrate, and a second leader line including first end connected to the end portion and a second end connected to the wiring on the second substrate.

4 Claims, 19 Drawing Sheets

(56) References Cited

FOREIGN PATENT DOCUMENTS

| | | |
|---|---|---|
| JP | 4405247 B2 | 1/2010 |
| JP | 4648860 B2 | 3/2011 |

OTHER PUBLICATIONS

International Search Report, dated Apr. 3, 2018, for International Application No. PCT/JP2018/008823, 4 pages. (With English translation).

* cited by examiner

FIG. 16A

| DIAGONAL COORDINATE SYSTEM | | EDGE PORTION FLAG | NORMAL COORDINATE SYSTEM | |
|---|---|---|---|---|
| A | B | | X | Y |
| a1 | b1 | False | x1 | y1 |
| a2 | b2 | False | x2 | y1 |
| a3 | b3 | False | x3 | y3 |
| a4 | b4 | True | x4 | y4 |
| ⋮ | ⋮ | ⋮ | ⋮ | ⋮ |

FIG. 16B

| DIAGONAL COORDINATE SYSTEM | | NORMAL COORDINATE SYSTEM | |
|---|---|---|---|
| $\Delta A$ | $\Delta B$ | $\Delta X$ | $\Delta Y$ |
| $\Delta a1$ | $\Delta b1$ | $\Delta x1$ | $\Delta y1$ |
| $\Delta a2$ | $\Delta b2$ | $\Delta x2$ | $\Delta y1$ |
| $\Delta a3$ | $\Delta b3$ | $\Delta x3$ | $\Delta y3$ |
| $\Delta a4$ | $\Delta b4$ | $\Delta x4$ | $\Delta y4$ |
| ⋮ | ⋮ | ⋮ | ⋮ |

SENSOR INCLUDING A PLURALITY OF SUBSTRATES

TECHNICAL FIELD

The present disclosure relates to a sensor, and particularly, to a sensor stacked in a display apparatus and used.

BACKGROUND ART

There is a known position detection apparatus in which a sensor detects an alternating magnetic field transmitted from a position indicator to detect the position of the position indicator. Examples of known specific systems of this type of position detection apparatus include an electromagnetic (EM) system in which a battery needs to be provided on the position indicator and an electromagnetic resonance (EMR) (registered trademark) system of using an electromagnetic wave transmitted by the position detection apparatus through the sensor to generate power in the position indicator. While the electromagnetic wave is transmitted only from the position indicator to the position detection apparatus in the EM system, the electromagnetic wave is transferred in both directions in the EMR (registered trademark) system.

The sensor of the position detection apparatus includes a set of a plurality of first coils (loop electrodes) elongated and extended in a first direction and second coils (loop electrodes) elongated and extended in a second direction crossing the first direction. Although the first and second directions are usually a long-side direction and a short-side direction of a rectangle detection region, respectively, Patent Document 1 discloses a technique of diagonally forming the coils with respect to the long-side direction of the detection region.

In addition, the position detection apparatus requires a controller. A leader line for connecting the controller and each coil is conventionally arranged outside of the detection region as also described in Patent Document 1, and the controller is connected to the corresponding coil on an edge portion of the detection region. Therefore, an invalid area in which the position of the position indicator cannot be detected is formed outside of the detection region. However, the trend of narrowing the bezel of the display apparatus in recent years often does not permit to provide a wide invalid area, and reduction of the invalid area is demanded.

With regard to the problem, Patent Document 2 discloses a technique, in which the connection point of the leader line and each coil is provided on a center portion of the detection region instead of the edge portion, and the leader lines are arranged between the coils. According to the technique, the invalid area provided outside of the detection region can be minimized.

PRIOR ART DOCUMENT

Patent Documents

Patent Document 1: Japanese Patent No. 4648860
Patent Document 2: Japanese Patent No. 4405247

SUMMARY

Technical Problems

Incidentally, the position detection apparatus and the display apparatus are placed on top of each other in a tablet terminal, and the display apparatus usually includes a gate line extended in the long-side direction of the detection region. Therefore, when the gate line of the display apparatus is driven by a predetermined signal, the coils extending in the long-side direction of the detection region are affected by the signal throughout the entire length. As a result, the magnetic flux generated by the coils affects the operation of the display apparatus, and the user may perceive this as moire patterns. According to the technique of Patent Document 1, all of the coils of the position detection apparatus are not parallel to the gate line of the display apparatus, and this can reduce the influence on the operation of the display apparatus caused by the magnetic flux generated by the coils.

Therefore, the inventor of the present application is examining to provide the connection point of the leader line and each coil on the center portion of the detection region instead of the edge portion as in Patent Document 2 in the configuration of Patent Document 1 in which each coil is formed diagonally with respect to the long-side direction of the detection region in order to reduce the influence on the operation of the display apparatus caused by the magnetic flux generated by the coils of the position detection apparatus and in order to minimize the invalid area provided outside of the detection region. However, it has been discovered that if the configuration is adopted, the visibility of the display apparatus is reduced, and the arrangement efficiency of various circuits provided in the tablet terminal is reduced. Hereinafter, the problems will be described in detail.

The tablet terminal generally includes a display module and a circuit unit arranged on the back surface of the display module (surface on the opposite side of the display surface). A display panel of the display apparatus and a sensor provided with the coils of the position detection apparatus are arranged in the display module. Various circuits, such as a processor of the tablet terminal, a controller of the position detection apparatus, and a control circuit of the display apparatus, are arranged in the circuit unit.

First, the reduction in the visibility of the display apparatus will be described. In the configuration of Patent Document 1, the sensor is arranged on the display surface side of the display panel. In the arrangement, if the connection point of the leader line and the coil is provided on the center portion of the detection region instead of the edge portion as in Patent Document 2, the leader line also needs to be arranged on the center portion of the detection region, and the visibility of the display apparatus is reduced.

Next, the reduction in the arrangement efficiency of various circuits will be described. A rectangle flexible substrate is used to connect the controller of the position detection apparatus and the leader line in the sensor. The flexible substrate is bent and arranged so as to enfold one side of the sensor. The flexible substrate is connected to the leader line of the sensor in the display module and connected to the controller on the back surface of the display module.

A terminal group connected to the leader lines is arranged on an end portion on the leader line side of the flexible substrate. Here, if the leader lines are arranged between the coils as in Patent Document 2, the leader lines are also diagonally arranged when the coils are diagonally arranged as in Patent Document 1. Therefore, the terminal group connected to the leader lines also needs to be diagonally arranged, and the entire flexible substrate is diagonally arranged. As a result, the controller also needs to be diagonally arranged.

FIG. 19 is a diagram illustrating a state in which the flexible substrate and the controller are diagonally arranged. FIG. 19 illustrates: a back surface of a display module 100 in which a sensor not illustrated is arranged inside; a controller 102 that provides the position detection apparatus along with the sensor; and a flexible substrate 101 that connects the sensor and the controller 102. In addition, a region A illustrated in FIG. 19 represents a region in which other circuits in the circuit unit can be arranged. As can be understood from the shape of the region A, if the flexible substrate 101 and the controller 102 are diagonally arranged with respect to the back surface of the display module 100, there is a region around them in which other circuits cannot be arranged, and this reduces the arrangement efficiency of various circuits. Note that if the flexible substrate 101 is formed in a special shape (for example, parallelogram) in the example of FIG. 19, the controller 102 can be provided parallel to the back surface of the display module 100. However, it is difficult to process the flexible substrate 101 into a special shape, and the crimping operation also becomes difficult. In addition, the length of wiring on the flexible substrate 101 becomes nonuniform, and the design of the correction process (S2 in FIG. 9) described later may also become difficult.

Therefore, an object of the present disclosure is to provide a sensor that can suppress reduction in visibility of a display apparatus and reduction in arrangement efficiency of various circuits even when each coil is formed diagonally with respect to a long-side direction of a detection region, and a connection point of a leader line and the coil is provided on a center portion of a detection region instead of an edge portion.

Technical Solution

A first aspect of the present disclosure provides a sensor including: a first substrate which, in operation, is arranged on a back side of a display panel; a first coil extending in a first direction at a predetermined angle larger than 0 degrees and smaller than 90 degrees with respect to a long-side direction of the first substrate, the first coil including a first long-side portion provided with a first end portion and a second end portion; a second coil including a second long-side portion extending in a second direction crossing the first direction; a first leader line including a first end and a second end, wherein the first end is connected to the first end portion of the first coil, and the second end is connected to wiring on a second substrate arranged to extend at a right angle toward an outside of the sensor from one side of the first substrate; and a second leader line including a first end connected to the second end portion of the first coil and a second end connected to the wiring on the second substrate.

A second aspect of the present disclosure provides the sensor according to the first aspect, in which a terminal group arranged side by side in the long-side direction of the first substrate is formed on the second substrate, and the second end of the first leader line and the second end of the second leader line are connected to the wiring on the second substrate through the terminal group.

A third aspect of the present disclosure provides the sensor according to the first aspect, in which the first substrate is a multilayer substrate including a plurality of layers including a first layer, a second layer, and a third layer, the first long-side portion is provided in the second layer, the second long-side portion is provided in the third layer, and the first and second leader lines are provided in the first layer.

A fourth aspect of the present disclosure provides the sensor according to the first aspect, in which the first and second coils are formed such that at least part of a short-side portion of the first coil and at least part of a short-side portion of the second coil overlap while the sensor is viewed in plan view.

A fifth aspect of the present disclosure provides the sensor according to the fourth aspect, in which the first and second coils are formed such that an acute angle portion of the first coil and an obtuse angle portion of the second coil overlap while the sensor is viewed in plan view.

A sixth aspect of the present disclosure provides the sensor according to the second aspect, in which each of the first and second leader lines is provided on a detection region of the sensor while the sensor is viewed in plan view, each of the first and second leader lines includes: a first section extending in the second direction, wherein a first end of the first section is connected to a corresponding one of the first and second end portions of the coil; a second section extending in the first direction, wherein a first end of the second section is connected to a second end of the first section; and a third section extending in the second direction, wherein a first end of the third section is connected to a second end of the second section, the first substrate is a multilayer substrate including a plurality of layers including first and second layers, the first coil and the second section are provided in the first layer, and the second coil and the first and third sections are provided in the second layer.

A seventh aspect of the present disclosure provides a sensor including: a rectangle first substrate; and an integrated circuit, in which the first substrate is provided with a plurality of first coils each including a first long-side portion extending in a first direction forming a predetermined angle larger than 0 degrees and smaller than 90 degrees with respect to a long-side direction of the first substrate, and a plurality of second coils each including a second long-side portion extending in a second direction crossing the first direction, and the integrated circuit, in operation, supplies different voltages or currents to each of the plurality of first and second coils according to whether the shape of each of the plurality of first and second coils is a parallelogram or a trapezoid.

An eighth aspect of the present disclosure provides a sensor including: a rectangle first substrate; and an integrated circuit, in which the first substrate is provided with a plurality of first coils each including a first long-side portion extending in a first direction forming a predetermined angle larger than 0 degrees and smaller than 90 degrees with respect to a long-side direction of the first substrate, and a plurality of second coils each including a second long-side portion extending in a second direction crossing the first direction, the integrated circuit includes a processor and a memory storing instructions and information indicating whether each of a plurality of intersections formed by each of the plurality of first coils and each of the plurality of second coils is positioned on a center of a detection region, and when the processor executes the instructions stored in the memory, the processor causes the integrated circuit to detect a first intersection closest to a position of a stylus among the plurality of intersections formed by each of the plurality of first coils and each of the plurality of second coils based on a level observed in each of the plurality of first and second coils, and determine whether the first intersection is positioned on an edge portion of the detection region based on the information stored in the memory.

Advantageous Effects

According to the first aspect of the present disclosure, the first substrate is arranged on the back side of the display panel. Therefore, although the connection points of the first and second leader lines and the first coils are provided on the center portion of the detection region instead of the edge portion, the reduction in the visibility of the display apparatus caused by the first and second leader lines can be suppressed. In addition, the first and second leader lines can be freely wired. Therefore, the second substrate can be arranged such that the one end portion extends at the right angle toward the outside from the one side of the first substrate, and the reduction in the arrangement efficiency of various circuits can also be suppressed.

According to the second aspect of the present disclosure, the length of the wiring formed on the second substrate can be uniform regardless of the extension direction of the leader line. Therefore, the correction process in the controller can be performed based on only the difference in the wiring length on the first substrate.

According to the third and sixth aspects of the present disclosure, even if the first coil is a separated coil not intersecting the second coil, the first coil can be connected to the wiring on the second substrate through the first and second leader lines.

According to the fourth aspect of the present disclosure, signal changes of three or more coils to be used for coordinate calculation can be suitably acquired up to near the short-side portion. This can particularly increase the accuracy of the position detection near the edge portion of the detection region.

According to the fifth and seventh aspects of the present disclosure, the distribution of the magnetic flux density can be equalized in the end portion of the detection region or in the entire detection region.

According to the eighth aspect of the present disclosure, whether or not the position of the stylus is positioned in the edge portion of the detection region can be determined without rotation transformation.

BRIEF DESCRIPTION OF THE DRAWINGS

FIG. 12A is a diagram illustrating an example in which an adjustment portion A1 is provided on an acute angle portion SAa of the coil 40a, and FIG. 12B is a diagram illustrating an example in which an adjustment portion A2 is provided on an obtuse angle portion OAa of the coil 40a.

FIGS. 16A and 16B are diagrams illustrating two tables stored in advance in a memory in the integrated circuit 20 according to the third embodiment of the present disclosure.

DETAILED DESCRIPTION

Hereinafter, embodiments of the present disclosure will be described in detail with reference to the attached drawings.

Figure 1:
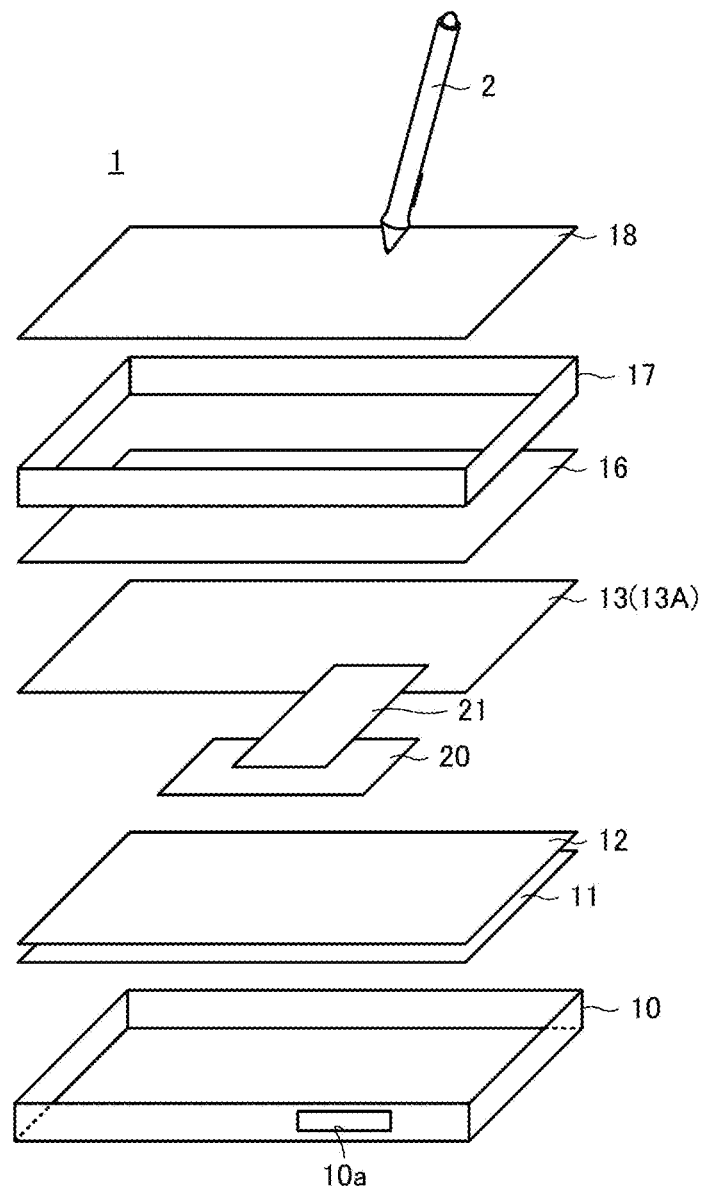
FIG. 1 is an exploded view of a tablet terminal 1 according to a first embodiment of the present disclosure.
Figure 2A:
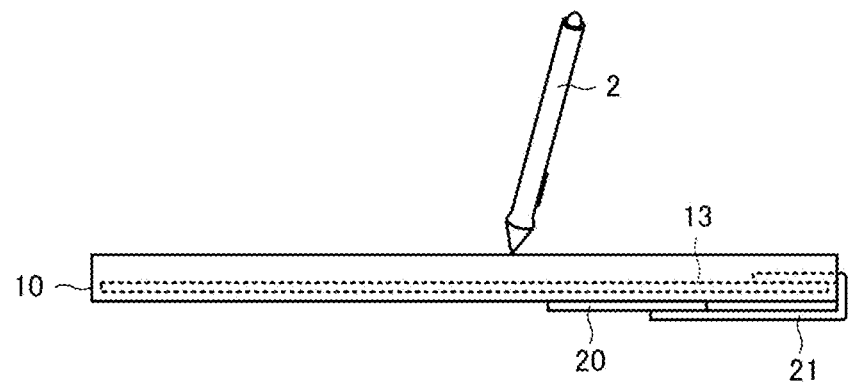
FIG. 2A is a side view of the tablet terminal 1.
Figure 2B:
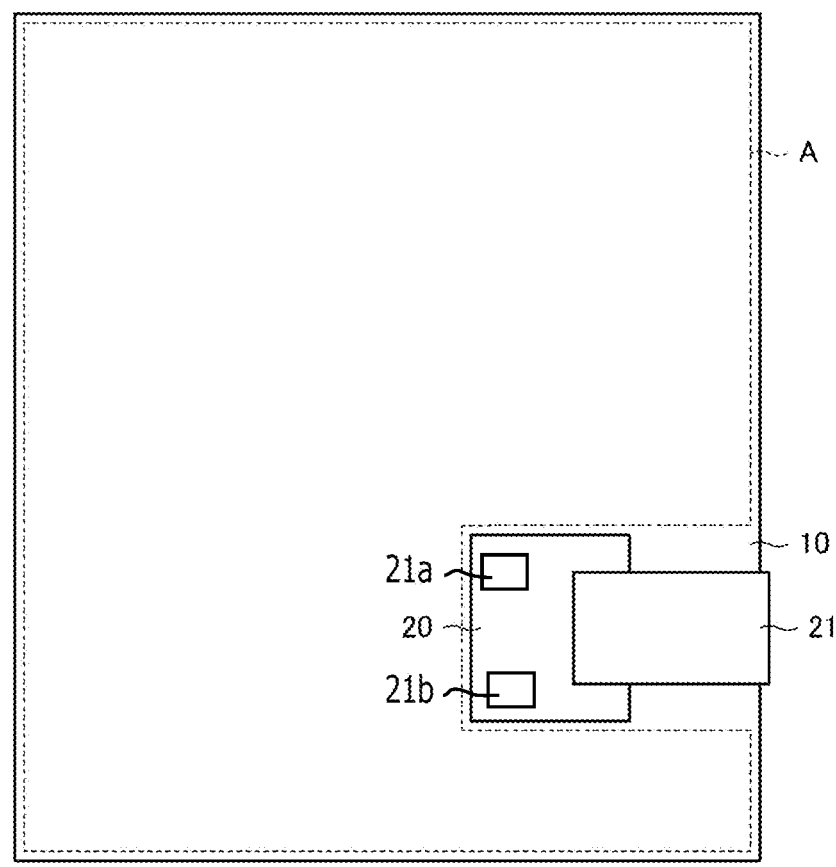
FIG. 2B is a rear view of the tablet terminal 1.

FIG. 1 is an exploded view of a tablet terminal 1 according to a first embodiment of the present disclosure. In addition, FIG. 2A is a side view of the tablet terminal 1, and FIG. 2B is a rear view of the tablet terminal 1. In FIGS. 1 and 2A, an upper side corresponds to a display surface (touch surface) of the tablet terminal 1, and a lower side corresponds to a back surface of the tablet terminal 1.

As illustrated in FIGS. 1 and 2, the tablet terminal 1 has a structure including, from a back side, a shield plate 11, a spacer 12, a sensor 13, a display panel 16, and a glass 18 that are layered in a display module back surface cover 10 in a bathtub shape in which the back side is closed. Among these, side surfaces of at least the sensor 13 and the display panel 16 are covered by a display module frame 17 for protection and fixation. The display module frame 17 is, for example, an adhesive tape. Although not illustrated, the tablet terminal 1 further includes a housing that covers the entire tablet terminal 1 (including an integrated circuit 20 and a bent substrate 21 described later) except the surface of the glass 18. The surface of the glass 18 provides a display surface and a touch surface of the tablet terminal 1.

As illustrated in FIGS. 2A and 2B, the integrated circuit 20 (controller) that provides a position detection apparatus along with the sensor 13 is installed on the back surface of the display module back surface cover 10. The integrated circuit 20 includes a processor 20a (processing circuit) that plays a role of controlling the entire tablet terminal 1 and a memory 20b storing applications or instructions that, when executed by the processor 20a, cause the integrated circuit to perform the acts described herein, a control circuit of the display panel 16, and the like are also arranged on the back surface of the display module back surface cover 10. A region A illustrated in FIG. 2B represents a region in which the circuits can be arranged.

The tablet terminal 1 also includes the bent substrate 21 (second substrate) for connecting the integrated circuit 20 and the sensor 13. The bent substrate 21 is, for example, a flexible substrate or a flexible printed circuit (FPC) formed by a thin plastic film, and the bent substrate 21 can be bent. This property is used to arrange the bent substrate 21 in the tablet terminal 1 in a state in which the bent substrate 21 is bent so as to enfold one side of the sensor 13 and the display panel 16 as illustrated in FIG. 2A. One end of the bent substrate 21 is introduced into the display module back surface cover 10 through an opening portion 10*a* of the display module back surface cover 10 illustrated in FIG. 1 and is connected to terminals 42*a* and 42*b* (described later) of the sensor 13. The other end of the bent substrate 21 is connected to the integrated circuit 20 on the back surface of the display module back surface cover 10.

The sensor 13 and the integrated circuit 20 provide the position detection apparatus in the EM system or the EMR (registered trademark) system and play a role of detecting the position of a stylus 2 (position indicator) in a predetermined detection region. The detection region is a rectangle region set to have an area slightly larger than a display region of the display panel 16 described later and is arranged to overlap the entire display region. The integrated circuit 20 detects, through the sensor 13, a pen signal (alternating magnetic field) transmitted by the stylus 2 to thereby detect the position of the stylus 2 in the detection region. Furthermore, in the case where the integrated circuit 20 corresponds to the EMR (registered trademark) system, the integrated circuit 20 also executes a process of transmitting an electromagnetic wave through the sensor 13 to generate power in the stylus 2. In this case, the stylus 2 uses the generated power to transmit the pen signal. Other details of the sensor 13 and the integrated circuit 20 (particularly, structure of sensor 13 and specific method of position detection of integrated circuit 20) will be described in detail later.

The display panel 16 is a display apparatus including liquid crystal, organic electroluminescence (EL), electronic paper, or the like. The specific type of the display panel 16 is not particularly limited. Specific display content of the display panel 16 is controlled by the processor and the control circuit. Although not illustrated, the display panel 16 includes the rectangle display region including a plurality of pixels arranged in a matrix and includes a bezel region set around the display region. Wiring for connecting the pixels to the control circuit is arranged in the bezel region.

Here, the arrangement of the sensor 13 (substrate 13A described later) on the back side of the display panel 16 is a feature of the present disclosure. The arrangement can be adopted to prevent the visibility of the display panel 16 from being reduced by the existence of leader lines 41*a* and 41*b* of coils 40*a* and 40*b* described later even if the leader lines 41*a* and 41*b* are provided on a center portion of the detection region. If the leader lines 41*a* and 41*b* can be provided on the center portion of the detection region, the region (the invalid area) in which the position of the stylus 2 positioned around the detection region cannot be detected can be reduced, and as a result, the bezel region can also be reduced. Therefore, in the present embodiment, the leader lines 41*a* and 41*b* are provided on the center portion of a detection region T as described in detail later with reference to FIGS. 4 to 7.

The shield plate 11 is a magnetic body arranged on the back surface of the sensor 13, and the shield plate 11 functions as an electromagnetic shield for preventing the electromagnetic wave generated by the sensor 13 from being leaked to the back side. In addition, the shield plate 11 also plays a role of a magnetic path of a magnetic flux generated by the sensor 13. The spacer 12 is, for example, a double-sided tape, and the spacer 12 plays a role of insulation between the wiring provided in the sensor 13 and the shield plate 11 and plays a role of fixing the sensor 13 to the shield plate 11.

Hereinafter, the details of the sensor 13 and the integrated circuit 20 will be described with reference to FIGS. 3 to 9.

Figure 3:
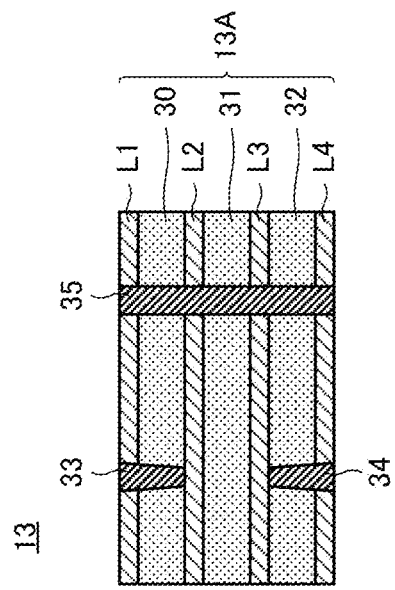
FIG. 3 is a schematic cross-sectional view of a sensor 13 according to the first embodiment of the present disclosure.

FIG. 3 is a schematic cross-sectional view of the sensor 13. As illustrated in FIG. 3, the sensor 13 includes the rectangle multilayer substrate 13A (first substrate) formed by laminating, from a display surface side, a wiring layer L1 (first layer), an insulating layer 30, a wiring layer L2 (second layer), an insulating layer 31, a wiring layer L3 (third layer), an insulating layer 32, and a wiring layer L4. The wiring layers L1 and L4 are outermost layers, and the wiring layers L2 and L3 are inner layers that are not outermost layers.

The wiring in the wiring layer L1 is connected to the wiring in the wiring layer L2 through a via conductor 33 passing through the insulating layer 30. Similarly, the wiring in the wiring layer L3 is connected to the wiring in the wiring layer L4 through a via conductor 34 passing through the insulating layer 32. In addition, the wiring in the wiring layer L1 is connected to the wiring in the wiring layer L4 through a via conductor 35 passing through the insulating layers 30 to 32 and the wiring layers L2 and L3.

FIGS. 4 to 7 are diagrams illustrating specific configurations of the wiring included in the wiring layers L1 to L4, respectively. Note that an X-axis direction and a Y-axis direction illustrated in the drawings denote a long-side direction and a short-side direction of the substrate 13A, respectively. In addition, an A-axis direction is a direction (first direction) at a predetermined angle larger than 0 degrees and smaller than 90 degrees with respect to the long-side direction of the substrate 13A, and a B-axis direction is a direction (second direction) crossing the A-axis direction. Typically, as illustrated in FIGS. 4 to 7, the A-axis direction and the X-axis direction form an angle of 45 degrees, and the A-axis direction and the B-axis direction are orthogonal to each other. However, the specific directions of the A-axis direction and the B-axis direction are not limited to these. For example, the B-axis direction and the Y-axis direction may not coincide with each other.

In the following description, the coordinate system including the X-axis direction and the Y-axis direction may be referred to as a "normal coordinate system," and the coordinate system including the A-axis direction and the B-axis direction may be referred to as a "diagonal coordinate system." The rectangle with vertices at four coordinates (X1, Y1), (X2, Y1), (X1, Y2), and (X2, Y2) in the illustrated normal coordinate system represents the detection region T of the sensor 13.

Figure 4:
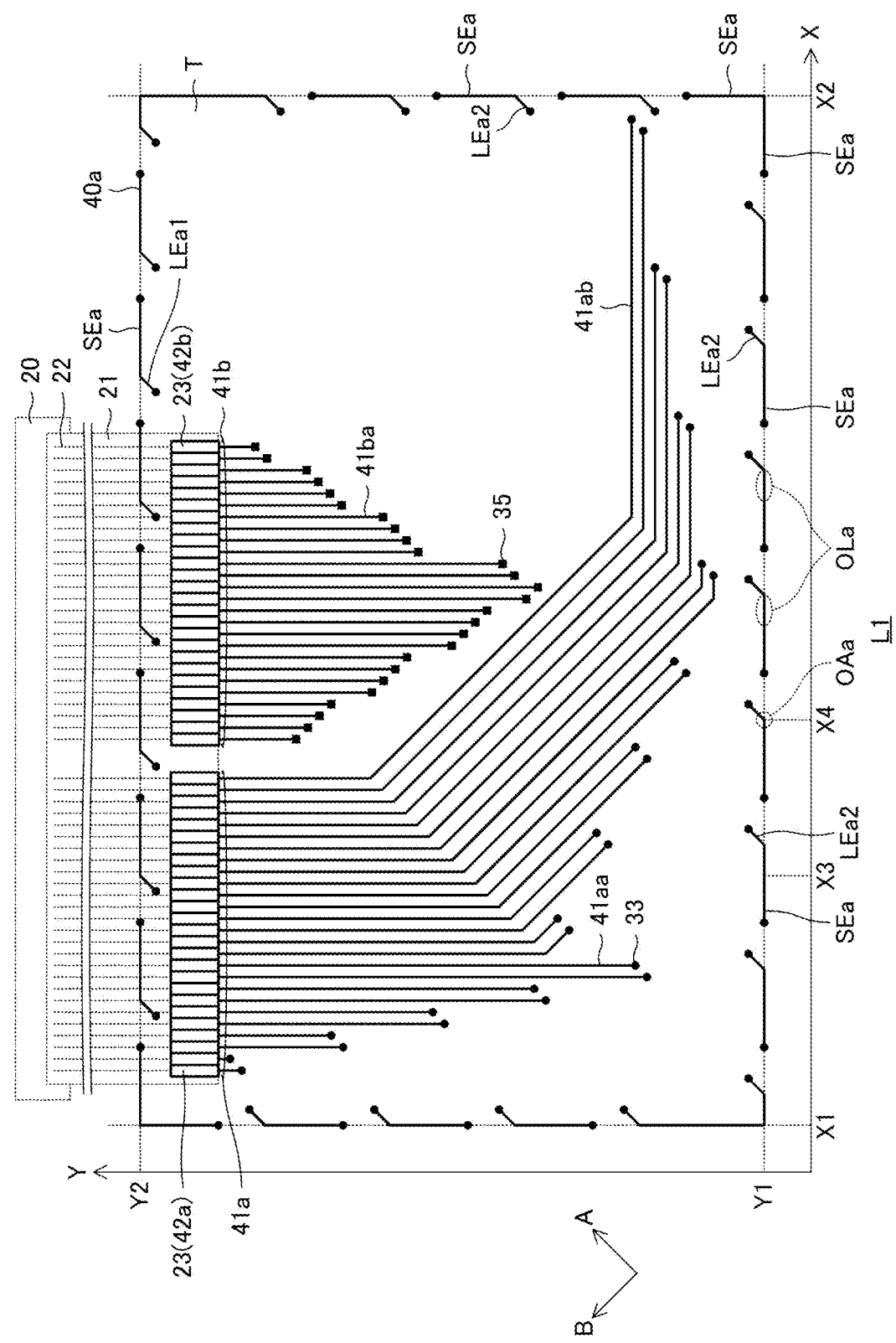
FIG. 4 is a diagram illustrating a specific configuration of wiring included in a wiring layer L1 of the sensor 13 according to the first embodiment of the present disclosure.
Figure 5:
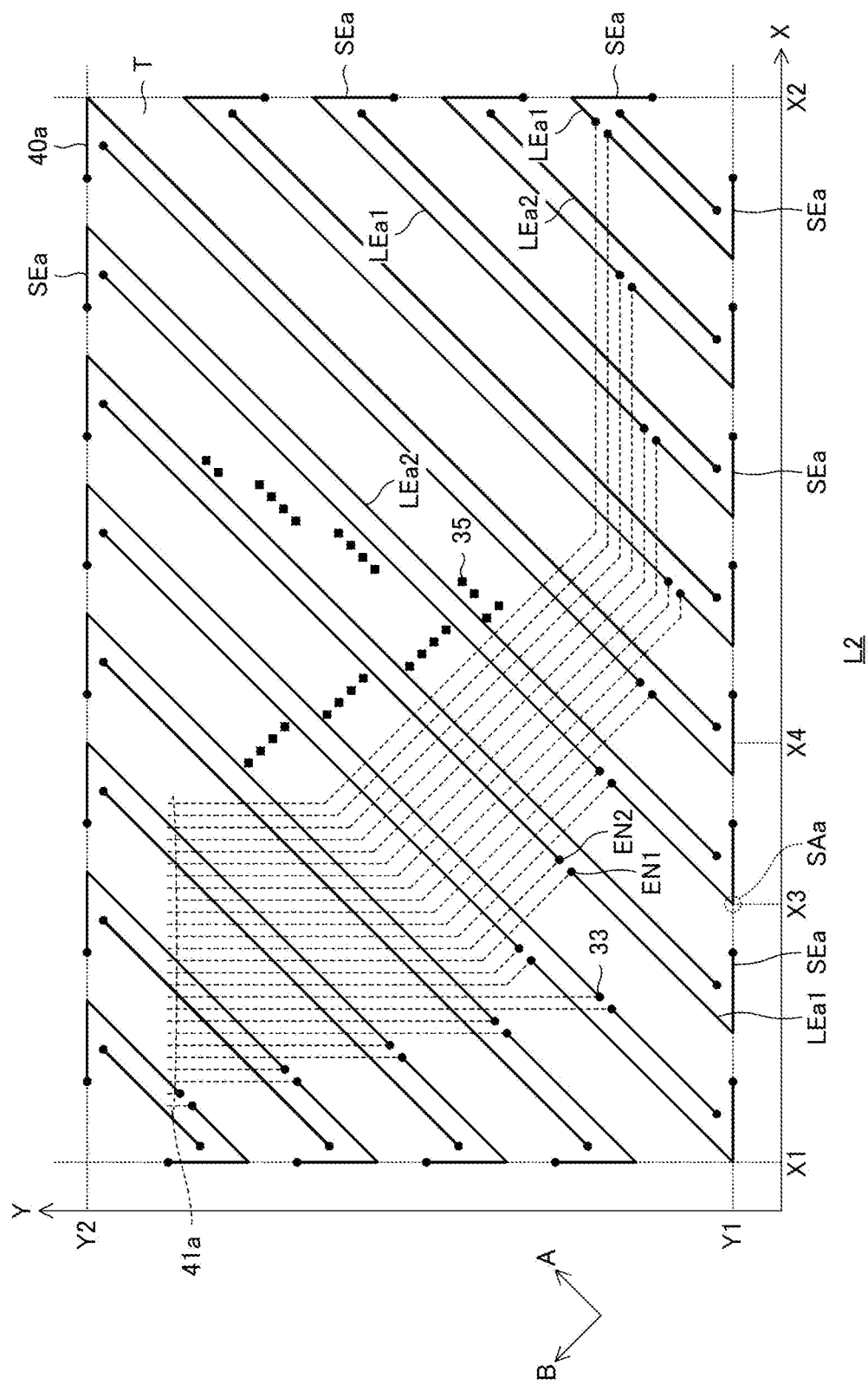
FIG. 5 is a diagram illustrating a specific configuration of wiring included in a wiring layer L2 of the sensor 13 according to the first embodiment of the present disclosure.

First, with reference to FIGS. 4 and 5, a plurality of coils 40*a* are formed in the wiring layers L1 and L2. Each of the plurality of coils 40*a* typically has a substantially parallelogram shape surrounded by long-side portions LEa1 and LEa2 extending in the A-axis direction and two short-side portions SEa extending in the X-axis direction. However, some of the coils 40*a* have a substantially trapezoid shape surrounded by long-side portions LEa1 and LEa2 extending in the A-axis direction, a short-side portion SEa extending in the X-axis direction, and a short-side portion SEa extending in the Y-axis direction. Furthermore, two coils 40*a* positioned at two parts among the four corners of the substrate 13A have a substantially triangle shape surrounded by a long-side portion LEa1 extending in the A-axis direction, a short-side portion SEa extending in the X-axis direction, and a short-side portion SEa extending in the Y-axis direction.

Main sections of each coil 40a are formed in the wiring layer L2, and some sections are formed in the wiring layer L1. The sections formed in the wiring layer L1 and the sections formed in the wiring layer L2 are connected to each other through the via conductors 33 indicated by black circles in FIGS. 4 and 5. The sections formed in the wiring layer L1 include sections overlapping adjacent coils 40a (first overlapping portions OLa illustrated in FIG. 4). Therefore, the plurality of coils 40a are arranged such that two adjacent coils 40a overlap in plan view.

The long-side portion LEa1 (first long-side portion) of each coil 40a is disconnected in the middle of the section formed in the wiring layer L2. Two open ends generated by the disconnection provide end portions EN1 and EN2 (first and second end portions) of the coils 40a, and the end portions EN1 and EN2 are connected to corresponding leader lines 41a (described later).

Figure 6:
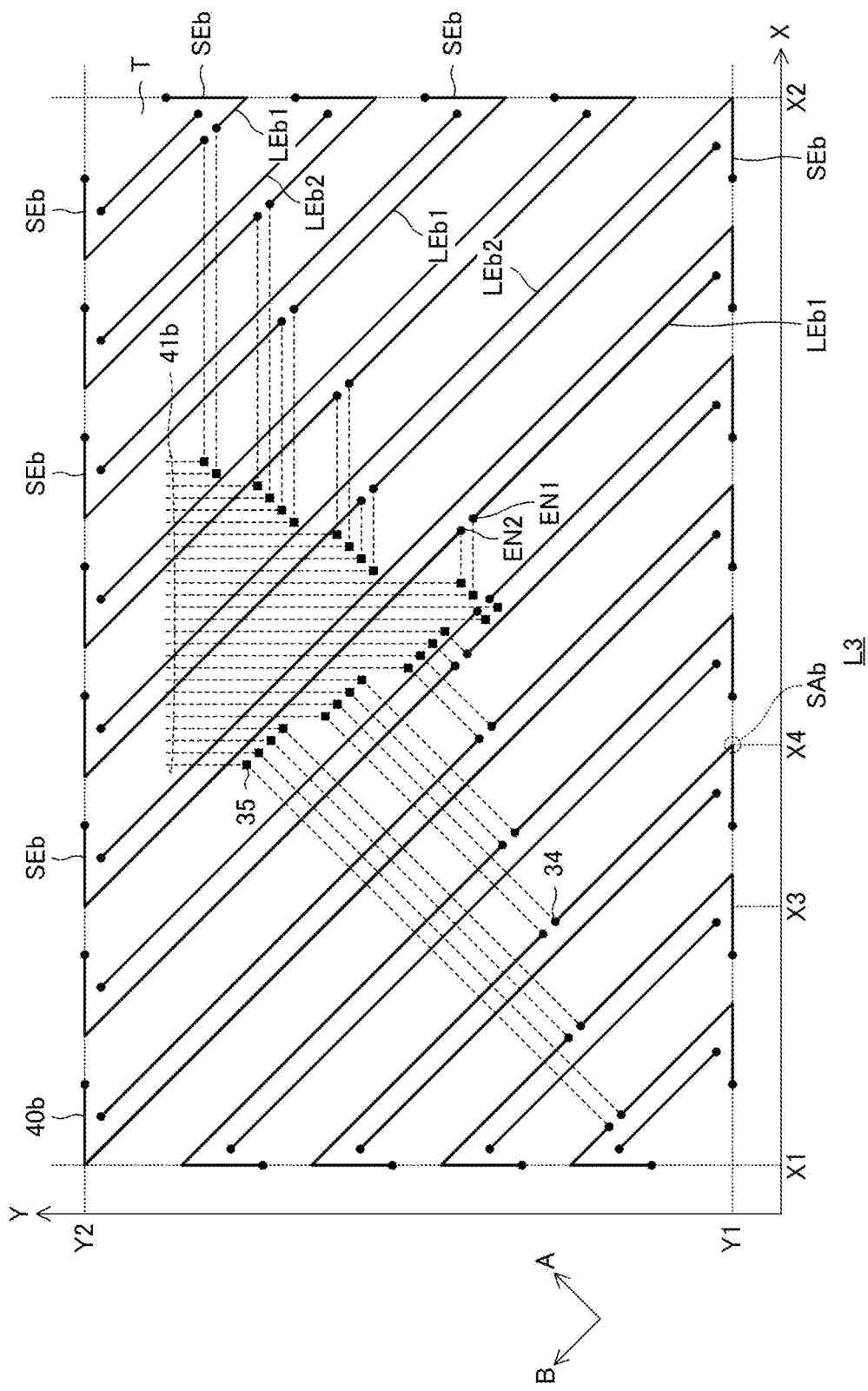
FIG. 6 is a diagram illustrating a specific configuration of wiring included in a wiring layer L3 of the sensor 13 according to the first embodiment of the present disclosure.
Figure 7:
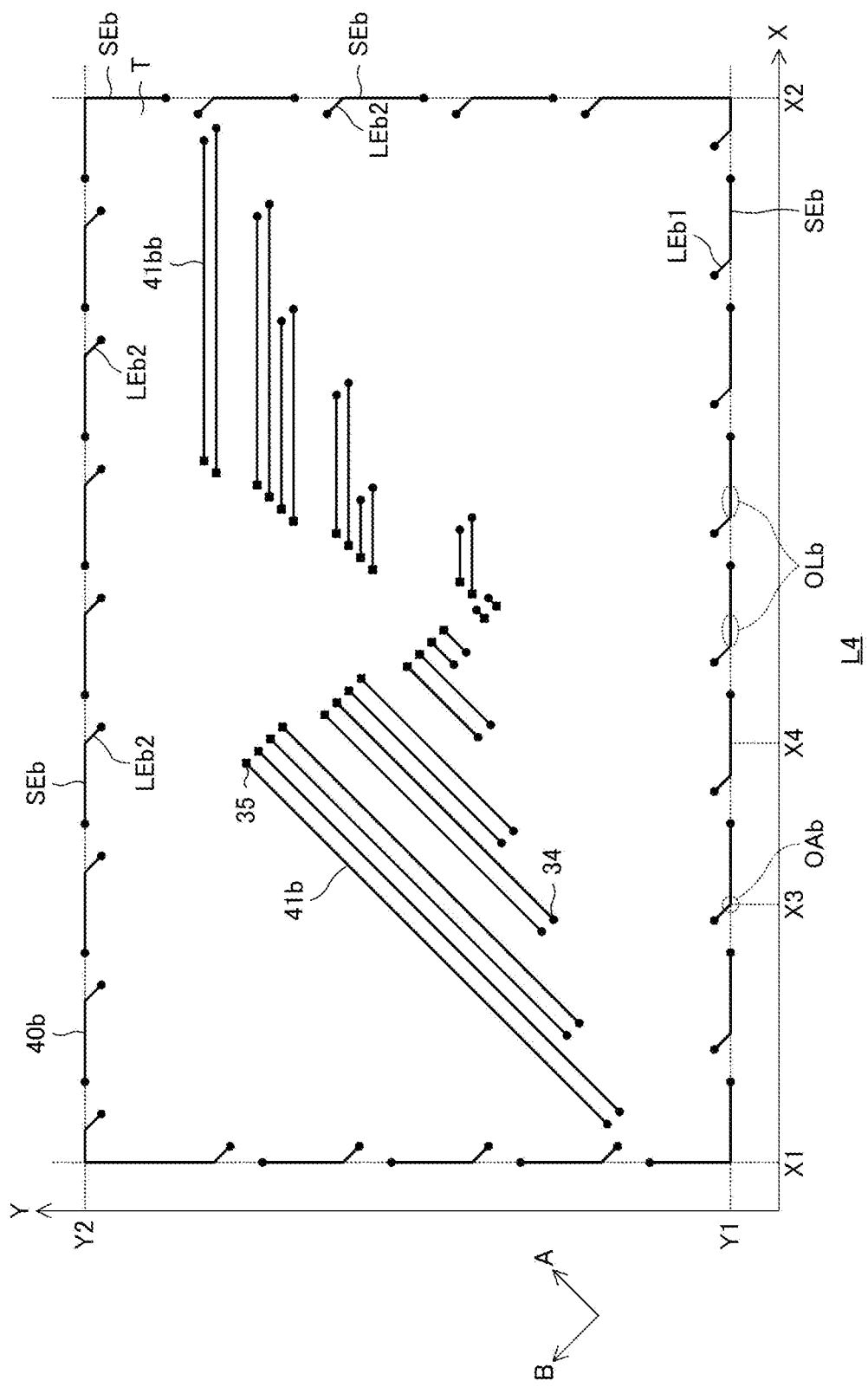
FIG. 7 is a diagram illustrating a specific configuration of wiring included in a wiring layer L4 of the sensor 13 according to the first embodiment of the present disclosure.

Next, with reference to FIGS. 6 and 7, a plurality of coils 40b are formed in the wiring layers L3 and L4. Each of the plurality of coils 40b typically has a substantially parallelogram shape surrounded by long-side portions LEb1 and LEb2 extending in the B-axis direction and two short-side portions SEb extending in the X-axis direction. However, some of the coils 40b have a substantially trapezoid shape surrounded by long-side portions LEb1 and LEb2 extending in the B-axis direction, a short-side portion SEb extending in the X-axis direction, and a short-side portion SEb extending in the Y-axis direction. Furthermore, two coils 40b positioned on two parts among the four corners of the substrate 13A have a substantially triangle shape surrounded by a long-side portion LEb1 extending in the B-axis direction, a short-side portion SEb extending in the X-axis direction, and a short-side portion SEb extending in the Y-axis direction.

Main sections of each coil 40b are formed in the wiring layer L3, and some sections are formed in the wiring layer L4. The sections formed in the wiring layer L3 and the sections formed in the wiring layer L4 are connected to each other through the via conductors 34 indicated by black circles in FIGS. 6 and 7. The sections formed in the wiring layer L4 include sections overlapping adjacent coils 40b (second overlapping portions OLb illustrated in FIG. 7). Therefore, the plurality of coils 40b are arranged such that two adjacent coils 40b overlap in plan view.

The long-side portion LEb1 (second long-side portion) of each coil 40b is disconnected in the middle of the section formed in the wiring layer L3. Two open ends generated by the disconnection provide end portions EN1 and EN2 of the coil 40b, and the end portions EN1 and EN2 are connected to corresponding leader lines 41b (described later).

With reference again to FIG. 4, the wiring layer L1 is further provided with a plurality of leader lines 41a and 41b and a terminal group including a plurality of terminals 42a and 42b. All of them are arranged in the detection region T. The terminals 42a and 42b are arranged side by side in the X-axis direction near one long side of the substrate 13A.

Here, the bent substrate 21 is arranged such that one end portion extends at a right angle toward the outside of the substrate 13A from one long side of the substrate 13A in plan view as illustrated in FIG. 4. In addition, a plurality of terminals 23 corresponding one to one with the plurality of terminals 42a and 42b is provided on one end portion of the bent substrate 21. Each terminal 23 is individually connected to the integrated circuit 20 through wiring 22 formed on the bent substrate 21 and is electrically connected to a corresponding one of the plurality of terminals 42a and 42b by crimping. According to the structure, each of the plurality of leader lines 41a and 41b is individually connected to the integrated circuit 20 through the corresponding one of the plurality of terminals 42a and 42b, the corresponding terminal 23, and the corresponding wiring 22.

Note that the bent substrate 21 and the substrate 13A may be formed as an integrated substrate. In this case, the plurality of terminals 42a and 42b and the plurality of terminals 23 may not be provided, and each of the plurality of leader lines 41a and 41b may be directly connected to the corresponding wiring 22.

The plurality of leader lines 41a (first and second leader lines) are provided to correspond to the end portions EN1 and EN2 of the coils 40a, respectively. Therefore, the number of leader lines 41a is twice the number of coils 40a. Each leader line 41a is connected to a corresponding one of the end portion EN1 and the end portion EN2 through the via conductor 33 indicated by a black circle in FIGS. 4 and 5. In this way, the end portions EN1 and EN2 of each coil 40a are connected to the integrated circuit 20.

The plurality of leader lines 41b are provided to correspond to the end portions EN1 and EN2 of the coils 40b, respectively. Therefore, the number of leader lines 41b is twice the number of coils 40b. Each leader line 41b is once drawn out to the wiring layer L4 through the via conductor 35 indicated by a black rectangle in FIGS. 4 to 7, drawn around to the position of corresponding one of the end portion EN1 and the end portion EN2 in the wiring layer L4, and then connected to the corresponding one of the end portion EN1 and the end portion EN2 through the via conductor 34 indicated by a black circle in FIGS. 6 and 7. In this way, the end portions EN1 and EN2 of each coil 40b are also connected to the integrated circuit 20.

Here, some of the plurality of leader lines 41a and 41b include bent portions extending in directions different from the A-axis direction and the B-axis direction (for example, partial wiring 41aa, 41ab, and 41ba illustrated in FIG. 4 and partial wiring 41bb illustrated in FIG. 7). The existence of the bent portions can be permitted to increase the degree of freedom of the wiring layout and efficiently arrange the leader lines 41a and 41b. In addition, the difference in wiring length between the leader lines 41a and 41b can also be reduced. Note that although the bent portions are provided on the leader lines 41a and 41b in the present embodiment, bent portions extending in directions different from the X-axis direction and the Y-axis direction may be provided on the terminals 42a and 42b. Similar advantageous effects can also be obtained in this way.

Figure 8:
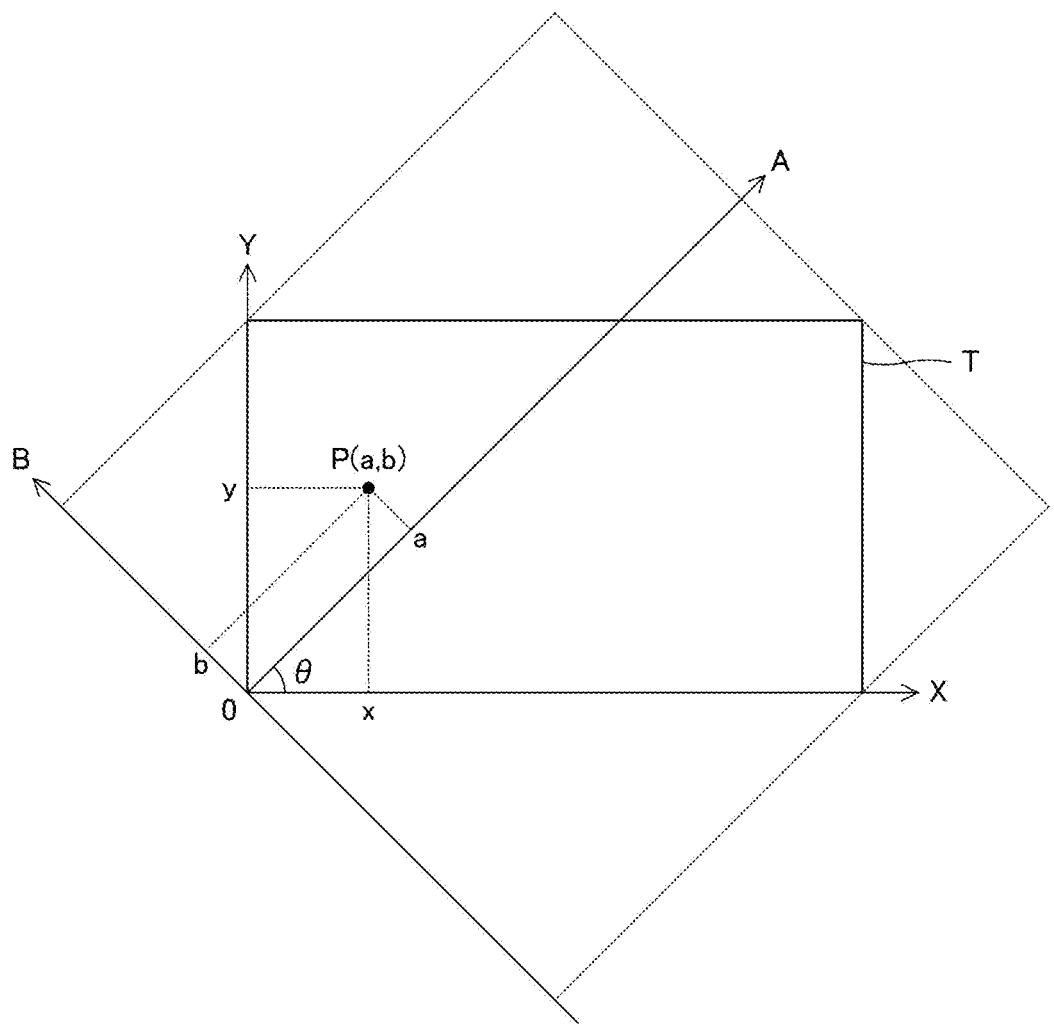
FIG. 8 is a diagram describing a position detection process performed by an integrated circuit 20 according to the first embodiment of the present disclosure.
Figure 9:
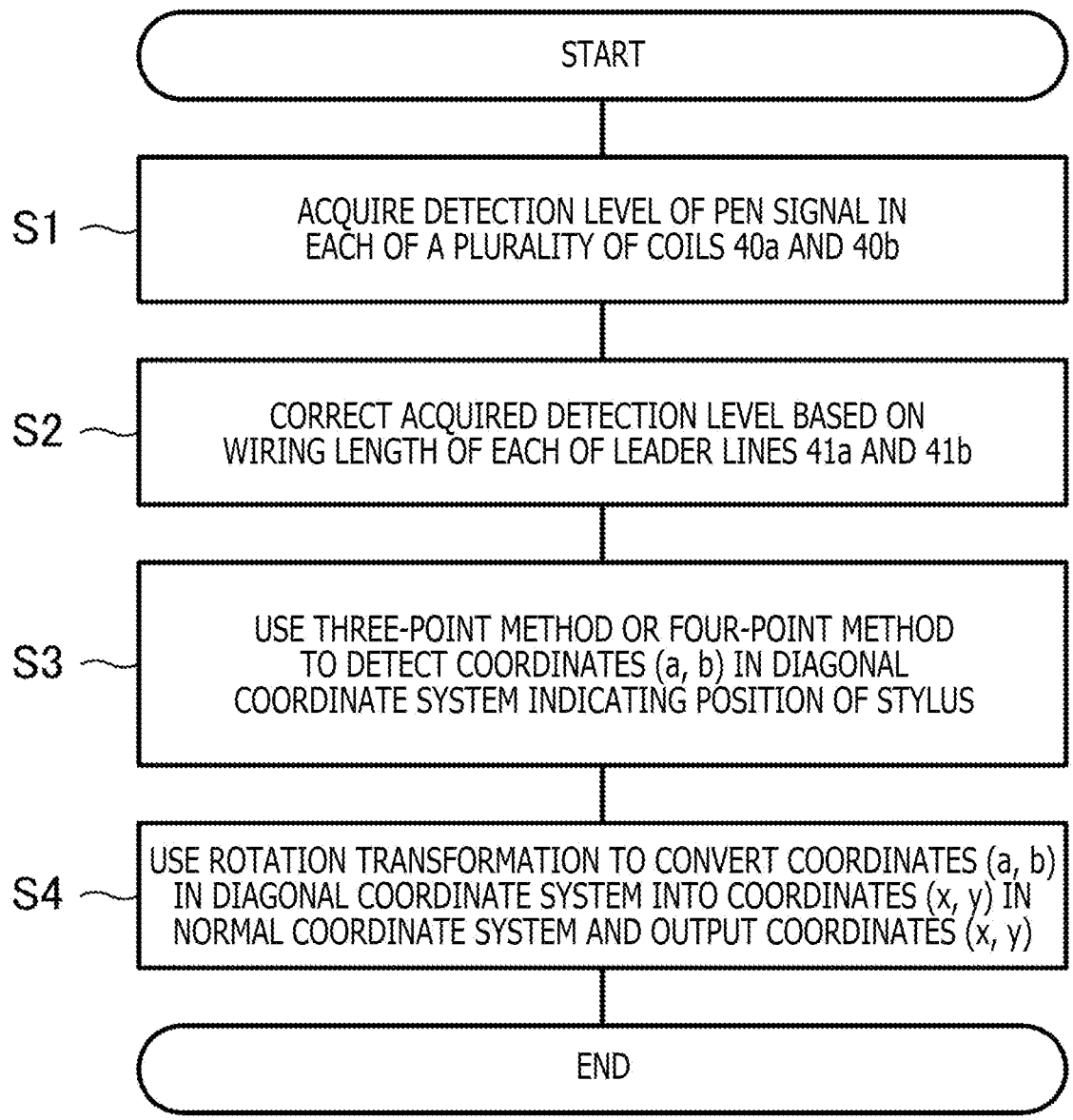
FIG. 9 is a flow chart of the position detection process performed by the integrated circuit 20 according to the first embodiment of the present disclosure.

FIG. 8 is a diagram describing a position detection process performed by the integrated circuit 20 using the sensor 13 with the structure as described above. In addition, FIG. 9 is a flow chart of the position detection process performed by the integrated circuit 20. Hereinafter, the position detection process using the sensor 13 will be described in detail with reference to the drawings.

First, the integrated circuit 20 repeats a process of sequentially scanning the plurality of coils 40a and 40b to acquire a detection level (received intensity) of a pen signal in each of the plurality of coils 40a and 40b (S1). Next, the integrated circuit 20 corrects the acquired detection level based on the wiring length of each of the leader lines 41a and 41b (S2). The correction process is a necessary process because the wiring length of each of the leader lines 41a and 41b is not constant. That is, the longer the wiring length of the leader lines 41a and 41b, the larger the wiring resistance.

Therefore, the level of the pen signal reaching the integrated circuit 20 becomes small. Thus, the correction process of the detection level based on the wiring length of each of the leader lines 41a and 41b is incorporated in advance into the integrated circuit 20.

Next, the integrated circuit 20 uses a three-point method or a four-point method to detect coordinates (a, b) in the diagonal coordinate system indicating a position P of the stylus 2 based on the detection level after the correction (S3). In relation to the A-axis, the three-point method is, for example, a system for generating a predetermined interpolation curve based on the detection levels of the pen signals in three coils 40a including the coil 40a with the highest detection level of the pen signal among the plurality of coils 40a and other two coils 40a positioned on both sides of the coil 40a and then setting the vertex of the interpolation curve as the A-axis coordinate. In the four-point method, the detection level of another coil 40a (for example, a coil 40a with the higher detection level of the two coils 40a positioned on both sides of the three coils 40a) is further used to generate the interpolation curve. This is similar for the B-axis.

The integrated circuit 20 that has acquired the coordinates (a, b) in the diagonal coordinate system uses a rotation transformation indicated in the following Equation (1) to convert the acquired coordinates (a, b) in the diagonal coordinate system into coordinates (x, y) in the normal coordinate system (S4). Here, e indicated in Equation (1) is an angle (for example, 45°) formed by the X-axis and the A-axis as illustrated in FIG. 8. Furthermore, Equation (1) is formulated on the assumption that the A-axis and the B-axis are orthogonal to each other, and in a case where the A-axis and the B-axis are not orthogonal to each other, the angle formed by the A-axis and the B-axis needs to be taken into account to modify Equation (1).

[Math. 1]

$$\begin{pmatrix} x \\ y \end{pmatrix} = \begin{pmatrix} \cos\theta & -\sin\theta \\ \sin\theta & \cos\theta \end{pmatrix} \begin{pmatrix} a \\ b \end{pmatrix} \quad (1)$$

The integrated circuit 20 is configured to output, to the processor, the coordinates (x, y) in the normal coordinate system obtained by the conversion (S4). As a result, the integrated circuit 20 can notify the processor of the coordinates (x, y) in the normal coordinate system.

As described above, according to the present embodiment, the substrate 13A is arranged on the back side of the display panel 16. Therefore, although the connection points (end portions EN1 and EN2) of the leader lines 41a and 41b and the coils 40a and 40b are provided on the center portion of the detection region T instead of the edge portion, the reduction in the visibility of the display panel 16 caused by the leader lines 41a and 41b can be suppressed.

Figure 19:
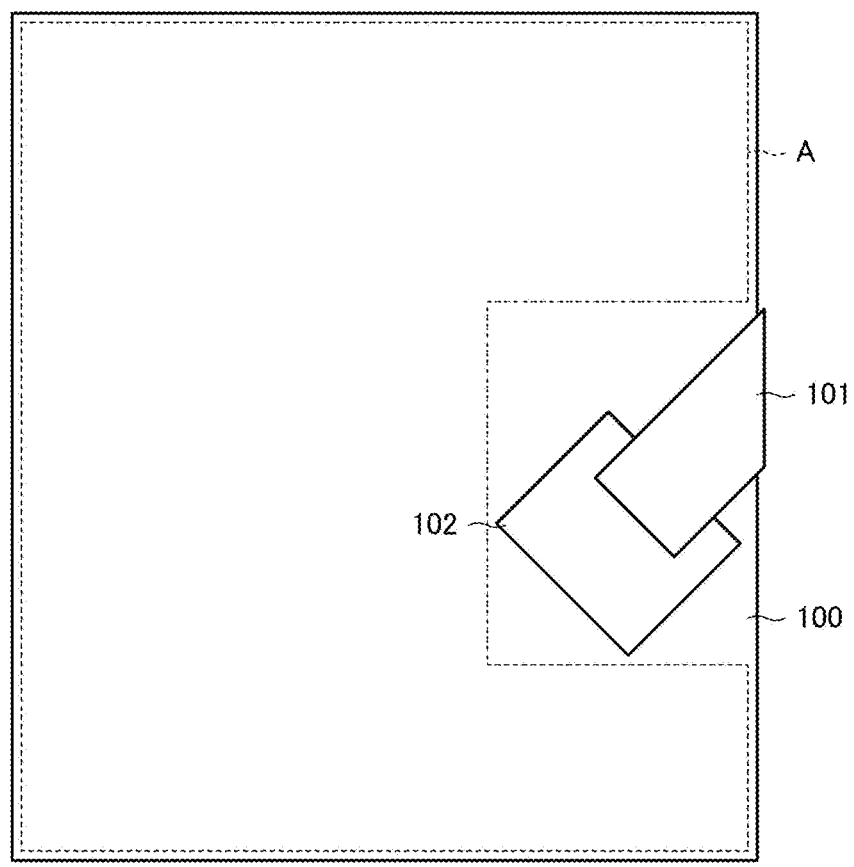
FIG. 19 is a diagram illustrating a state in which a flexible substrate and a controller are diagonally arranged.

In addition, according to the present embodiment, the leader lines 41a and 41b can be freely wired, and the bent substrate 21 can be arranged such that one end portion extends at a right angle toward the inside of the substrate 13A from one side of the substrate 13A in plan view. Therefore, the bent substrate 21 and the integrated circuit 20 can be straightly arranged on the back surface of the display module back surface cover 10 as illustrated in FIG. 2B, and this can suppress the reduction in the arrangement efficiency of various circuits including the integrated circuit 20 as can be understood by comparing the region A illustrated in FIG. 2B and the region A illustrated in FIG. 19.

In addition, according to the present embodiment, the terminals 42a and 42b are arranged side by side in the X-axis direction near one long side of the substrate 13A, and the length of the wiring 22 formed on the bent substrate 21 can be uniform regardless of the extension direction of the leader lines 41a and 41b. Therefore, the correction process of S2 illustrated in FIG. 9 can be performed based on only the difference in the wiring length on the substrate 13A.

This advantageous effect will be described in detail. In general, a company different from the vendor of the sensor 13 and the integrated circuit 20 assembles the tablet terminal 1, and the bent substrate 21 is prepared by the company that performs the assembly. Therefore, it is preferable to allow using a simple bent substrate 21 with uniform length of wiring 22. In this way, the vendor of the sensor 13 and the integrated circuit 20 can design the correction process at S2 illustrated in FIG. 9 without taking into account the difference in length of the wiring 22 formed on the bent substrate 21. According to the present embodiment, the simple bent substrate 21 can be used, and the vendor of the sensor 13 and the integrated circuit 20 can design the correction process at S2 illustrated in FIG. 9 without taking into account the difference in length of the wiring 22 formed on the bent substrate 21.

Hereinafter, other features of the tablet terminal 1 according to the present embodiment and advantageous effects attained by the features will be described.

Figure 10:
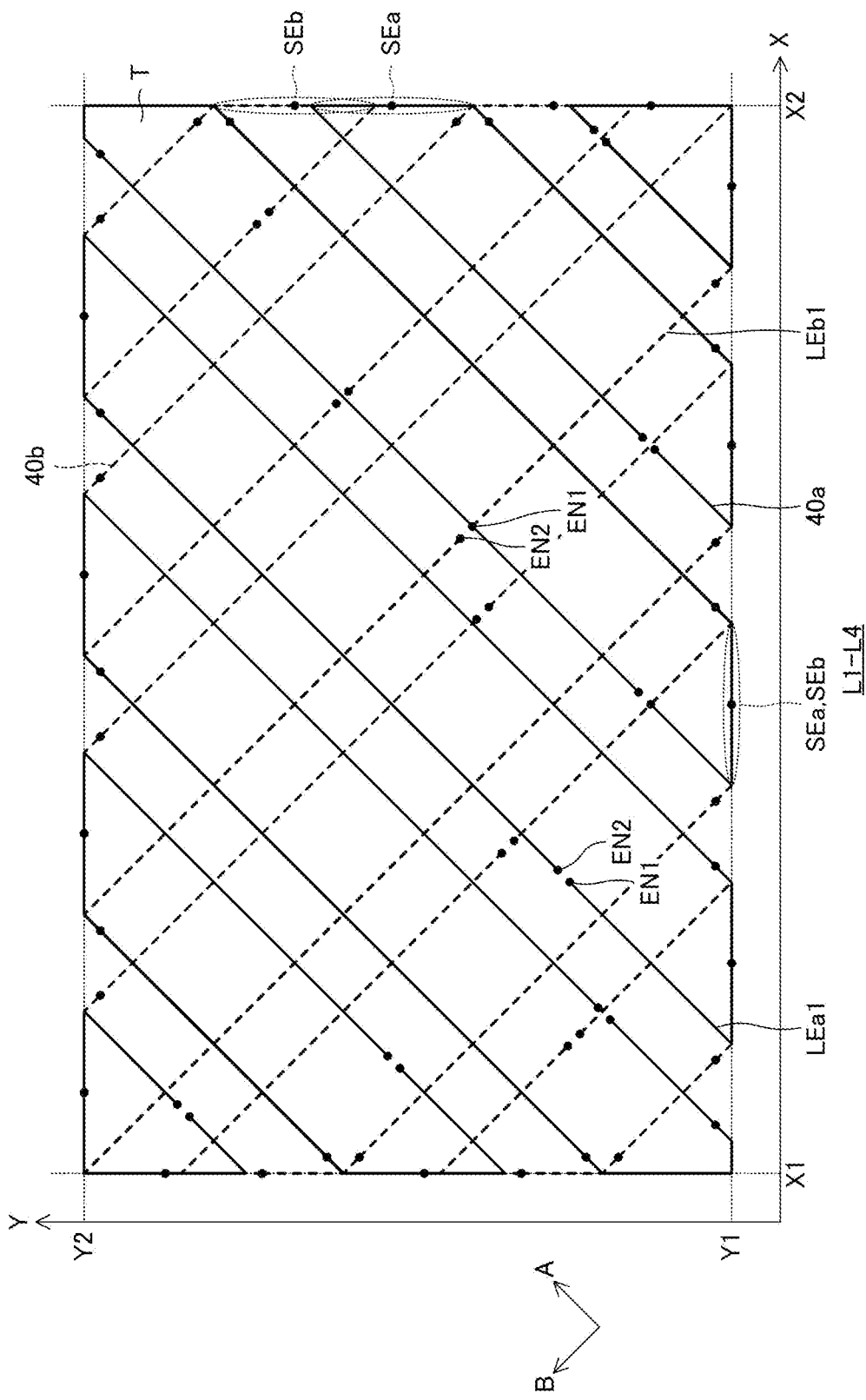
FIG. 10 is a diagram in which coils 40a and 40b illustrated in FIGS. 4 to 7 are placed and illustrated on top of each other.
Figure 11:
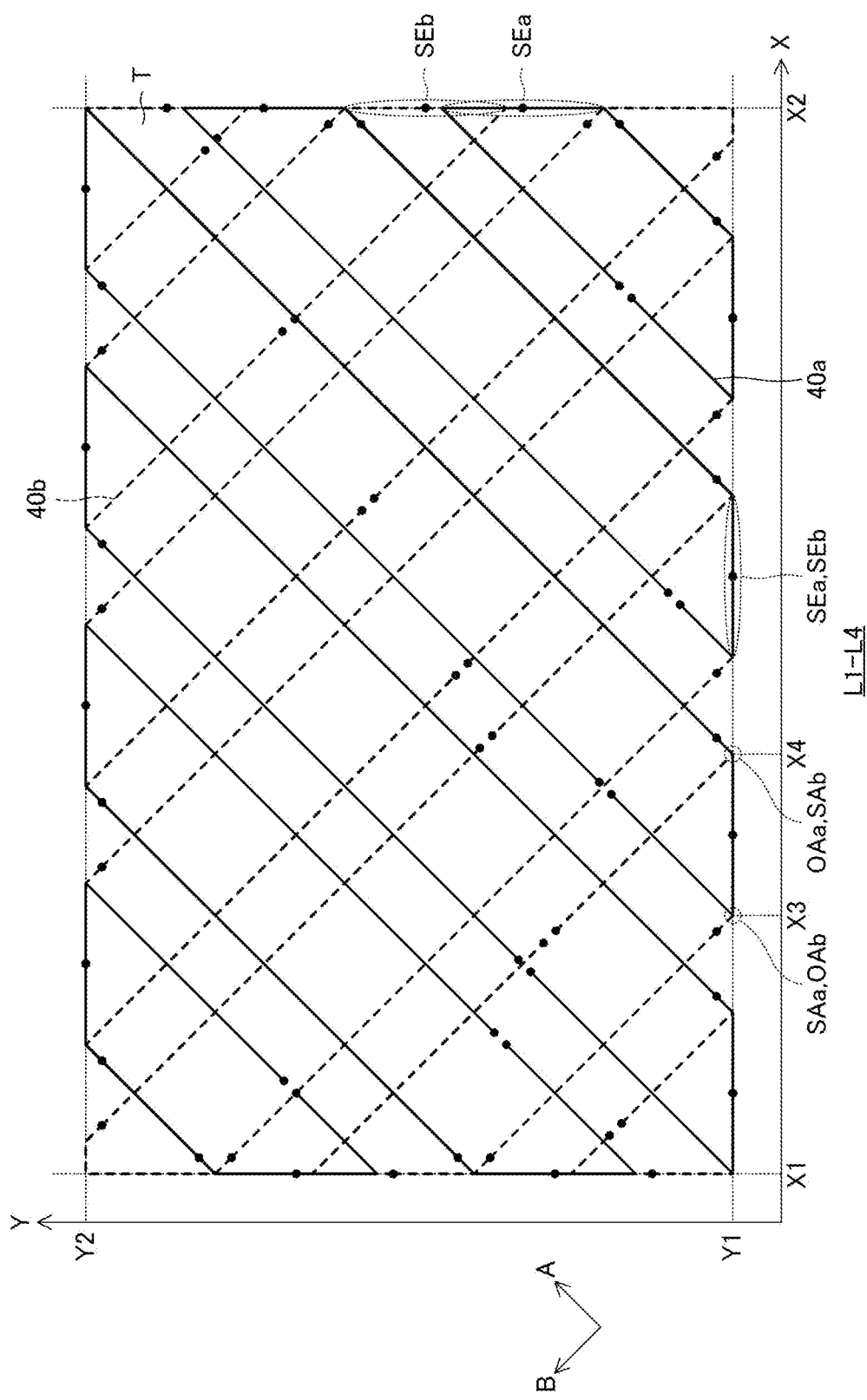
FIG. 11 is a diagram in which the coils 40a and 40b illustrated in FIGS. 4 to 7 are placed and illustrated on top of each other.

FIGS. 10 and 11 are diagrams in which the coils 40a and 40b illustrated in FIGS. 4 to 7 are placed and illustrated on top of each other. However, it is difficult to understand this if all of the coils 40a and 40b are placed and illustrated on top of each other. Therefore, half of the coils 40a and half of the coils 40b are illustrated in FIGS. 10 and 11. In addition, the coils 40a are indicated by solid lines, and the coils 40b are indicated by broken lines.

As illustrated in FIGS. 10 and 11, each of the plurality of coils 40a and 40b according to the present embodiment is formed such that at least part of the short-side portion SEa of the coil 40a and at least part of the short-side portion SEb of the coil 40b overlap in plan view. Particularly, the coils 40a and 40b are formed such that the short-side portion SEa of each coil 40a extending in the X-axis direction completely overlaps the short-side portion SEb of one of the plurality of coils 40b.

According to the configuration, the integrated circuit 20 can suitably acquire signal changes of three or more coils 40a and 40b used for the coordinate calculation, up to near each short-side portion. Therefore, the coordinate calculation can be performed by the three-point method using three or more coils (or the four-point method using four or more coils) even near the edge portion of the detection region T where the coordinate calculation is conventionally performed by the two-point method. This can increase the coordinate accuracy of the case in which the stylus 2 is positioned on the end portion of the detection region T (near the side). In this case, the integrated circuit 20 can be configured to perform the coordinate calculation by using both of the results of the detection by three coils 40a and the results of the detection by three coils 40b to further increase the coordinate accuracy. Additionally, in the examples of FIGS. 10 and 11, the coils 40a and 40b are formed such that the short-side portion SEa of each coil 40a extending in the X-axis direction completely overlaps the short-side portion SEb of one of the plurality of coils 40b, and the coordinate system can be further increased.

Furthermore, as illustrated at positions of X-axis coordinates X3 and X4 in FIG. 11, the plurality of coils 40a and 40b according to the present embodiment are formed such that an acute angle portion SAa of the parallelogram coil 40a and an obtuse angle portion OAb of the parallelogram coil 40b overlap in plan view. This is similar for an obtuse angle portion OAa of the parallelogram coil 40a and an acute angle portion SAb of the parallelogram coil 40b. Note that the acute angle portions SAa and SAb and the obtuse angle portions OAa and OAb are also illustrated in FIGS. 4 to 7. In addition, the integrated circuit 20 according to the present embodiment is configured to supply the current at the same time to the acute angle portion and the obtuse angle portion (that is, the coil including the acute angle portion and the coil including the obtuse angle portion) arranged at the same position in plan view when transmitting the electromagnetic wave through the sensor 13.

When the integrated circuit 20 corresponding to the EMR (registered trademark) system transmits the electromagnetic wave through the sensor 13, the magnetic flux density is high in the acute angle portions SAa and SAb, and the magnetic flux density is low in the obtuse angle portions OAa and OAb. Therefore, there may be a section with nonuniform magnetic flux density in the end portion of the detection region T or in the entire detection region T. However, according to the configuration, the sections with high magnetic flux density (acute angle portions SAa and SAb) and the sections with low magnetic flux density (obtuse angle portions OAa and OAb) are positioned at the same places in plan view. Therefore, the distribution of the magnetic flux density can be equalized in the end portion of the detection region T or in the entire detection region T.

Note that the uniformity of the magnetic flux density can also be attained by other configurations. Hereinafter, the other configurations will be described in detail.

Figure 12A:
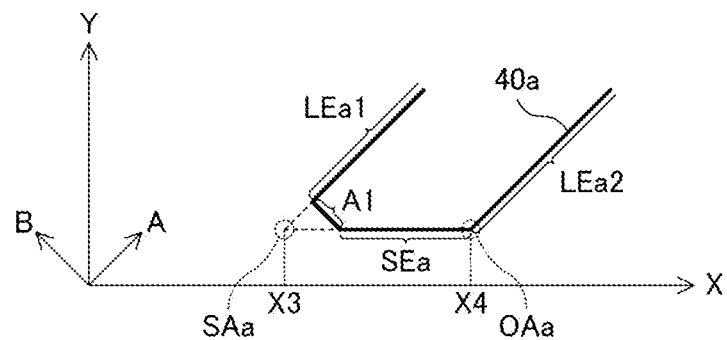

FIG. 12A is a diagram illustrating an example in which an adjustment portion A1 is provided on the acute angle portion SAa of the coil 40a. The adjustment portion A1 includes a short circuit wire of the acute angle portion SAa provided between the long-side portion (long-side portion LEa1 in this case) and the short-side portion SEa included in the acute angle portion SAa. The adjustment portion A1 can be provided on each acute angle portion of the coils 40a and 40b to reduce the difference in the magnetic flux density at the corner portions (particularly, difference from the obtuse angle portion). Therefore, the distribution of the magnetic flux density can be equalized.

Figure 12B:
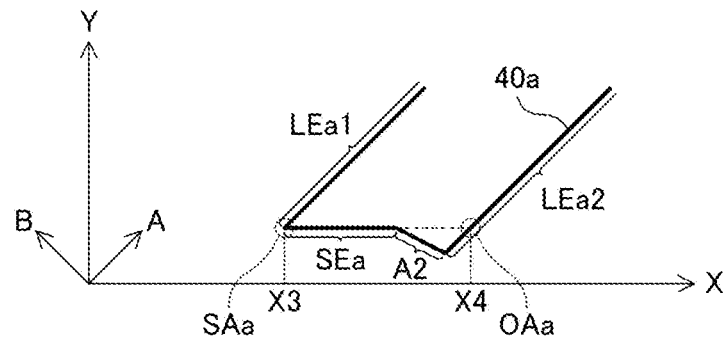

FIG. 12B is a diagram illustrating an example in which an adjustment portion A2 is provided on the obtuse angle portion OAa of the coil 40a. The adjustment portion A2 includes a line segment connecting: an end portion of the long-side portion (in this case, long-side portion LEa2) included in the obtuse angle portion OAa, the end portion obtained by extending the long-side portion toward the outside of the detection region T from the obtuse angle portion OAa; and an end portion of the short-side portion SEa included in the obtuse angle portion OAa, the end portion obtained by shortening the short-side portion SEa toward the corresponding acute angle portion. The adjustment portion A2 can be provided on each obtuse angle portion of the coils 40a and 40b to reduce the difference in the magnetic flux density at the corner portions (particularly, difference from the acute angle portion). Therefore, the distribution of the magnetic flux density can be equalized.

Next, a second embodiment of the present disclosure will be described. The configuration of the sensor 13 of the tablet terminal 1 according to the present embodiment is different from that of the tablet terminal 1 according to the first embodiment. The second embodiment is similar to the first embodiment in other respects. Therefore, the same reference signs are provided to the same components, and the differences from the first embodiment will be mainly described.

Figure 13:
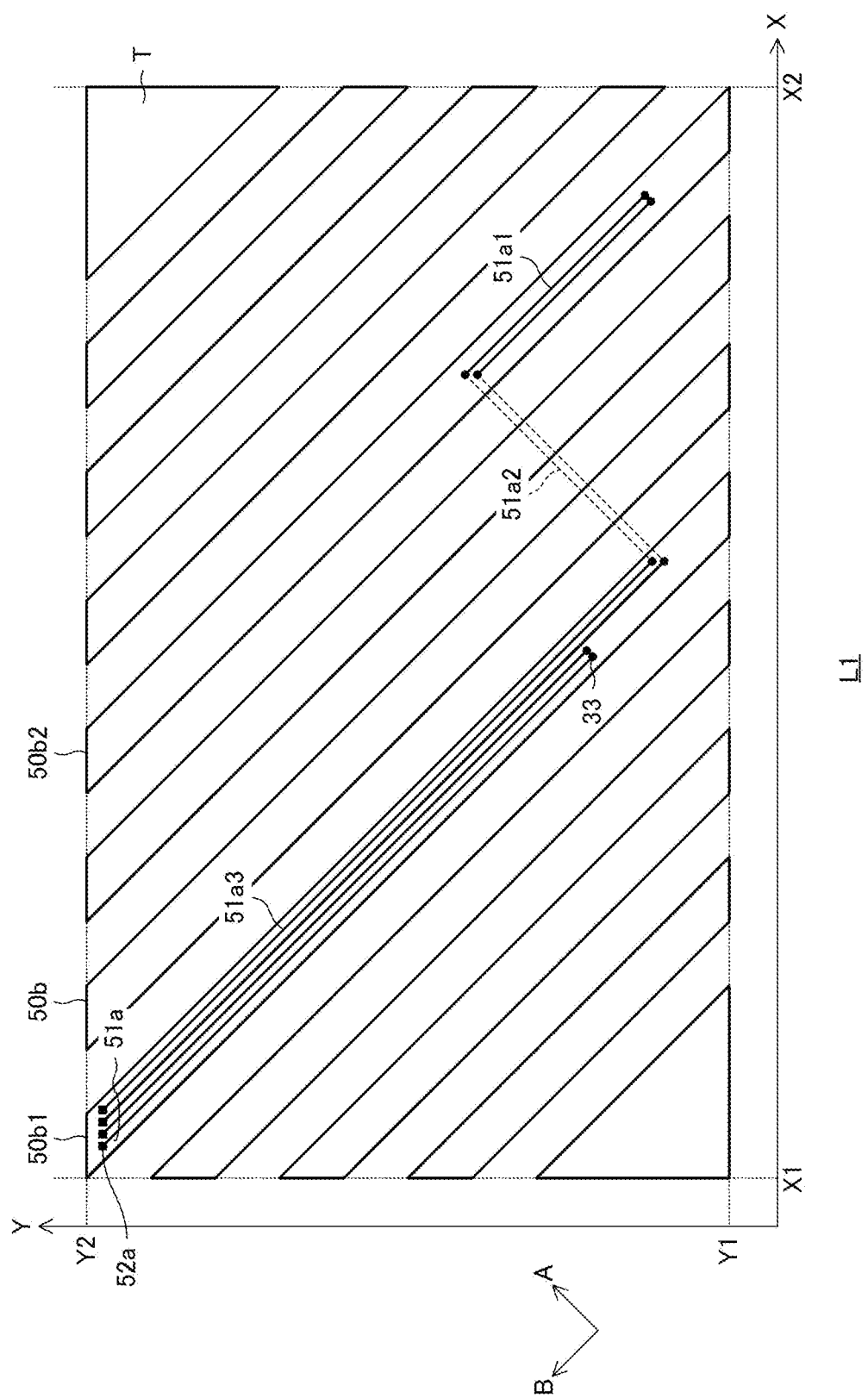
FIG. 13 is a diagram illustrating a specific configuration of the wiring included in the wiring layer L1 of the sensor 13 according to a second embodiment of the present disclosure.
Figure 14:
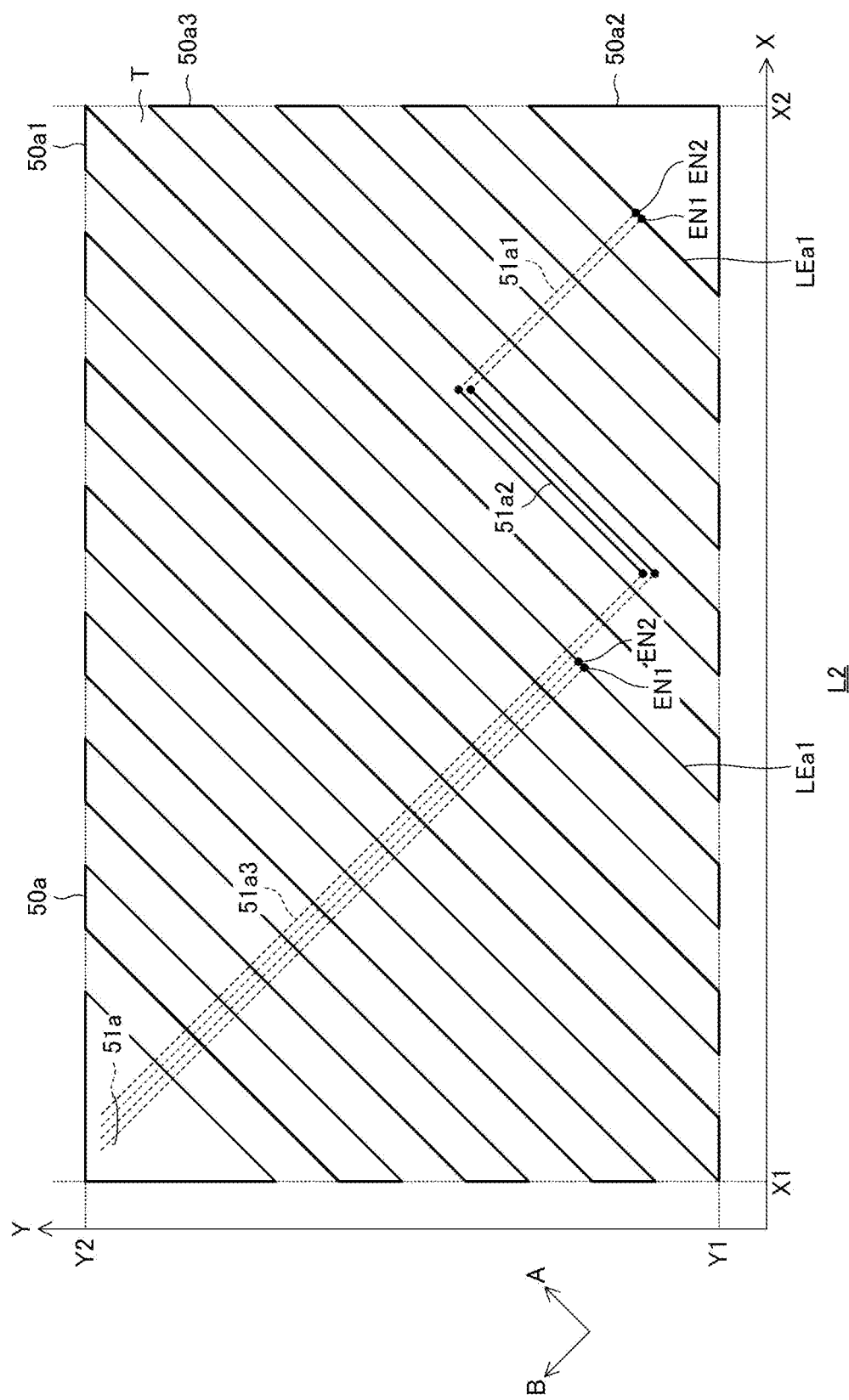
FIG. 14 is a diagram illustrating a specific configuration of the wiring included in the wiring layer L2 of the sensor 13 according to the second embodiment of the present disclosure.

FIGS. 13 and 14 are diagrams illustrating a specific configuration of the wiring included in the wiring layers L1 and L2 of the sensor 13 according to the present embodiment. The sensor 13 according to the present embodiment includes a plurality of coils 50a and 50b in place of the plurality of coils 40a and 40b. The plurality of coils 50a and 50b are different from the sensor 13 according to the first embodiment in that the coils 50a do not overlap with each other in plan view, and the coils 50b do not overlap with each other in plan view. According to the configuration, the coils 50a are formed only in the single wiring layer L2, and the coils 50b are formed only in the single wiring layer L1 in the present embodiment. Note that it is obvious that the coils 50a may be formed in the wiring layer L1, and the coils 50b may be formed in the wiring layer L2.

Leader lines 51a of the coil 50a and leader lines (not illustrated) of the coil 50b are formed in regions not interfering with the coils 50a and 50b in the wiring layers L1 and L2. As a result, the wiring layers L3 and L4 and the insulating layers 31 and 32 among the layers of the substrate 13A illustrated in FIG. 3 are eliminated, and the wiring layers L1 and L2 are the outermost layers in the present embodiment. In addition, the via conductors 34 and 35 illustrated in FIG. 3 are not provided on the sensor 13 according to the present embodiment.

FIGS. 13 and 14 illustrate only four leader lines 51a connected to two coils 50a1 and 50a2 among the plurality of leader lines 51a provided in association with the coils 50a. As illustrated in FIGS. 13 and 14, one end of each of the four leader lines 51a is connected to each of four terminals 52a provided in a region corresponding to the inside of a coil 50b1 that is one of the plurality of coils 50b. The four terminals 52a are arranged side by side in the X-axis direction near one long side of the substrate 13A as in the first embodiment and are connected to the terminals 23 (see FIG. 4) formed on the bent substrate 21. Although not illustrated, this is similar for the terminals 52a connected to the other leader lines 51a and the terminals connected to the leader lines of the coils 50b.

As can be understood from FIGS. 13 and 14, the coil 50a1 includes a section in which the corresponding terminal 52a overlaps the coil 50b1 formed inside of the coil 50a1 in plan view. Two leader lines 51a connected to the coil 50a1 are formed to extend in the B-axis direction in a region corresponding to the inside of the coil 50b1 in plan view and are connected to the end portions EN1 and EN2 of the coil 50a1 through the via conductor 33, respectively.

On the other hand, as can be understood from FIGS. 13 and 14, the coil 50a2 does not include a section in which the corresponding terminal 52a overlaps the coil 50b1 formed inside of the coil 50a2 in plan view. Hereinafter, the coil will be referred to as a "separated coil." Two leader lines 51a connected to the separated coil 50a2 cannot be connected to the coil 50a2 in the region corresponding to the inside of the coil 50b1 in plan view. Therefore, the connection of the leader line 51a and the coil 50a2 is realized through the wiring layer L2 in the middle. Hereinafter, the details will be described.

Each of the two leader lines 51a connected to the coil 50a2 includes: a first section 51a1 extending in the B-axis direction, in which one end is connected to a corresponding one of the end portions EN1 and EN2 of the coil 50a2; a second section 51*a*2 extending in the A-axis direction, in which one end is connected to the other end of the first section 51*a*1; and a third section 51*a*3 extending in the B-axis direction, in which one end is connected to the other end of the second section 51*a*2.

The third section 51*a*3 is a section formed in the region corresponding to the inside of the coil 50*b*1 in plan view. The other end of the third section 51*a*3 is connected to the corresponding terminal 52*a*.

The second section 51*a*2 is a section formed in the region corresponding to the inside of the coil 50*a*3 illustrated in FIG. 14. The coil 50*a*3 is a coil including a section overlapping the coil 50*b*1 in plan view among the plurality of coils 50*a* and including a section overlapping the coil 50*b*2 including a section overlapping the coil 50*a*2 in plan view among the plurality of coils 50*b*. In the example illustrated in FIGS. 13 and 14, the coil 50*a*1 also corresponds to this condition, and the coil 50*a*1 may also serve as the coil 50*a*3. The other end of the second section 51*a*2 is connected to one end of the third section 51*a*3 through the via conductor 33 in the region where the coils 50*b*1 and 50*a*3 overlap.

The first section 51*a*1 is a section formed in the region corresponding to the inside of the coil 50*b*2. The other end of the first section 51*a*1 is connected to one end of the second section 51*a*2 through the via conductor 33 in the region where the coils 50*a*2 and 50*b*2 overlap. One end of the first section 51*a*1 is connected to the corresponding one of the end portions EN1 and EN2 of the coil 50*a*2 through the via conductor 33.

As described above, according to the present embodiment, the first to third sections 51*a*1 to 51*a*3 are provided on the leader line 51*a*, and the separated coil 50*a*2 can be connected to the leader line 51*a*. Therefore, the separated coil 50*a*2 can be connected to the wiring 22 (see FIG. 4) on the bent substrate 22 while using a two-layer substrate that is not a multilayer substrate. Note that although the present embodiment focuses on the separated coil of the coil 50*a*, the present embodiment similarly applies to the separated coil of the coil 50*b*.

Note that a similar advantageous effect can be realized by providing one or more wiring layers different from the wiring layers provided with the coils 50*a* and 50*b* and arranging the leader lines of the coils 50*a* and 50*b* in the one or more wiring layers. The configuration is none other than a configuration obtained by changing the shapes of the coils 40*a* and 40*b* into the same shapes as the coils 50*a* and 50*b* in the first embodiment.

Next, a third embodiment of the present disclosure will be described. In the tablet terminal 1 according to the present embodiment, the operation of the integrated circuit 20 is different from that of the tablet terminal 1 according to the first embodiment. The third embodiment is similar to the first embodiment in other respects. Therefore, the same reference signs are provided to the same components, and the differences from the first embodiment will be mainly described.

Figure 15:
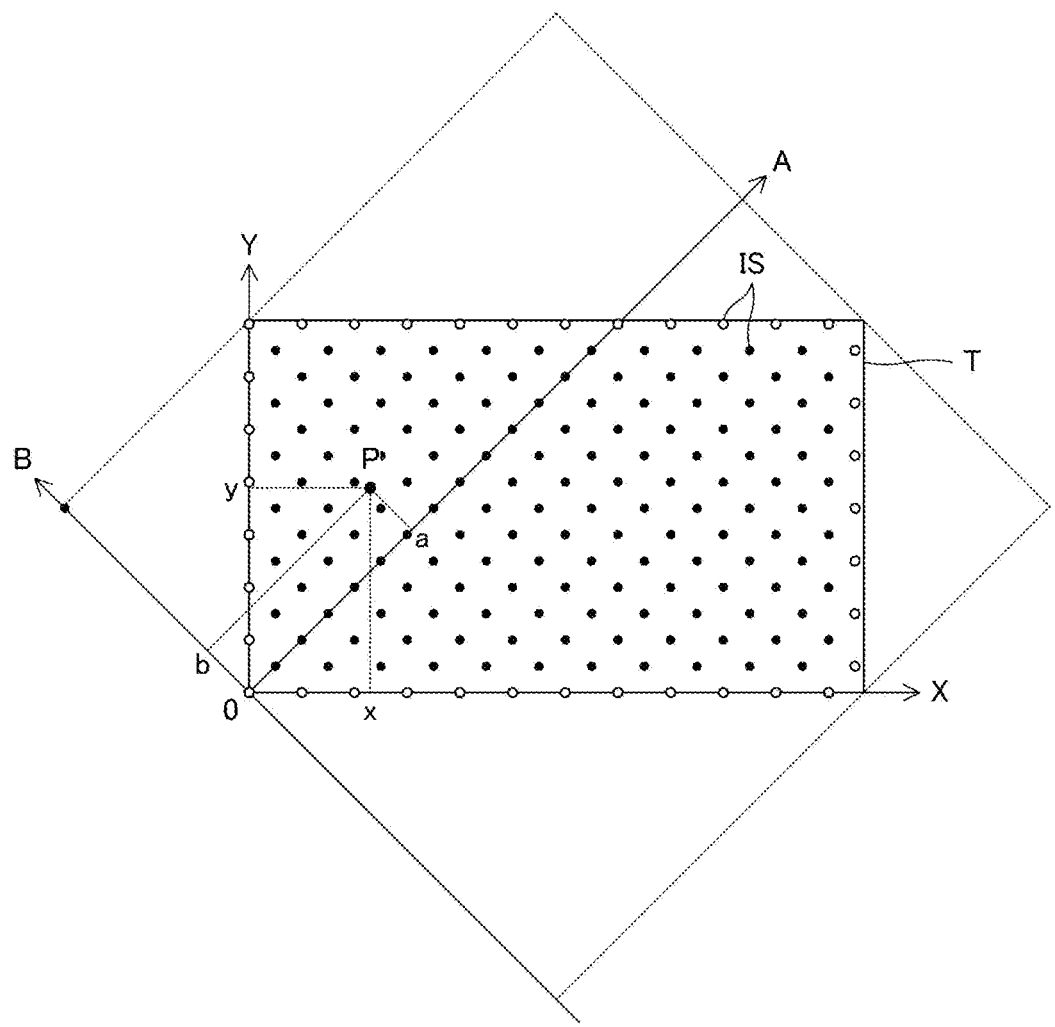
FIG. 15 is a diagram describing an outline of a position detection process performed by the integrated circuit 20 according to a third embodiment of the present disclosure.

FIG. 15 is a diagram describing an outline of a position detection process performed by the integrated circuit 20 according to the present embodiment. Black dots and white dots illustrated in FIG. 15 represent intersections IS of the coils 40*a* and 40*b*. The intersections IS indicated by the white dots are positioned on an edge portion of the detection region T. The integrated circuit 20 according to the present embodiment determines whether or not the stylus 2 is positioned on the edge portion of the detection region T when the integrated circuit 20 performs the position detection of the stylus 2 based on the level of the pen signal. In addition, when the integrated circuit 20 determines that the stylus 2 is positioned on the edge portion of the detection region T, the integrated circuit 20 uses the method described in the first embodiment (method based on rotation transformation) to obtain the coordinates (x, y) in the normal coordinate system. On the other hand, when the integrated circuit 20 determines that the stylus 2 is not positioned on the edge portion of the detection region T (that is, when the integrated circuit 20 determines that the stylus 2 is positioned on the center portion of the detection region T), the integrated circuit 20 uses a simpler method to obtain the coordinates (x, y) in the normal coordinate system.

FIGS. 16A and 16B are diagrams illustrating two tables stored in advance in the memory 21*b* in the integrated circuit 20 according to the present embodiment. The table illustrated in FIG. 16A is a table associating and storing, for each intersection IS, the coordinates in the diagonal coordinate system, the coordinates in the normal coordinate system, and an edge portion flag indicating whether or not the intersection IS is positioned on the edge portion of the detection region T. The table will be referred to as an "intersection table." On the other hand, the table illustrated in FIG. 16B is a table associating and storing the difference between the coordinates in the diagonal coordinate system and the difference between the coordinates in the normal coordinate system. The table will be referred to as a "difference table." The integrated circuit 20 according to the present embodiment uses the tables to perform a process of converting the coordinates (a, b) in the diagonal coordinate system into the coordinates (x, y) in the normal coordinate system.

Figure 17:
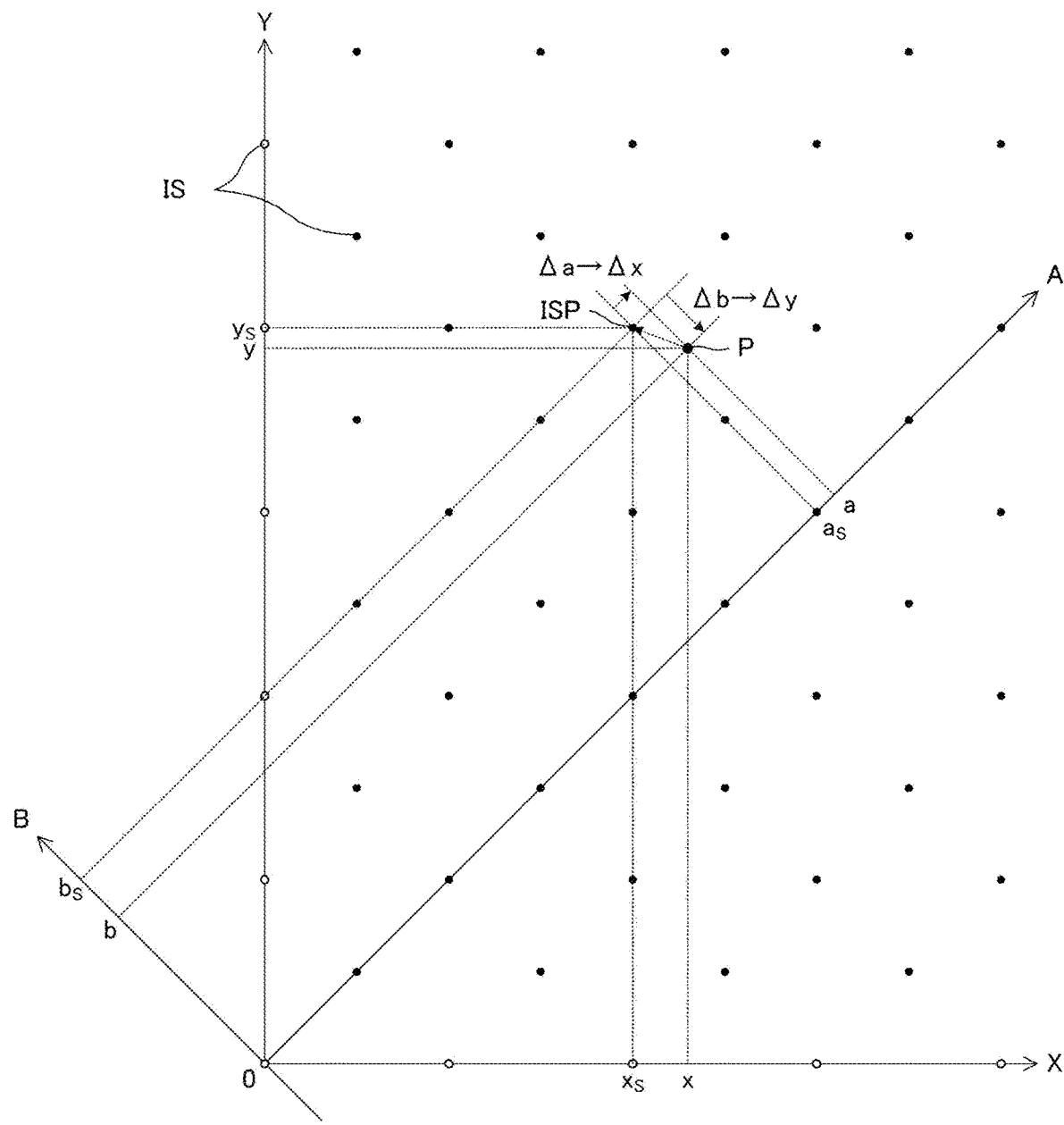
FIG. 17 is an enlarged view of part of FIG. 15.
Figure 18:
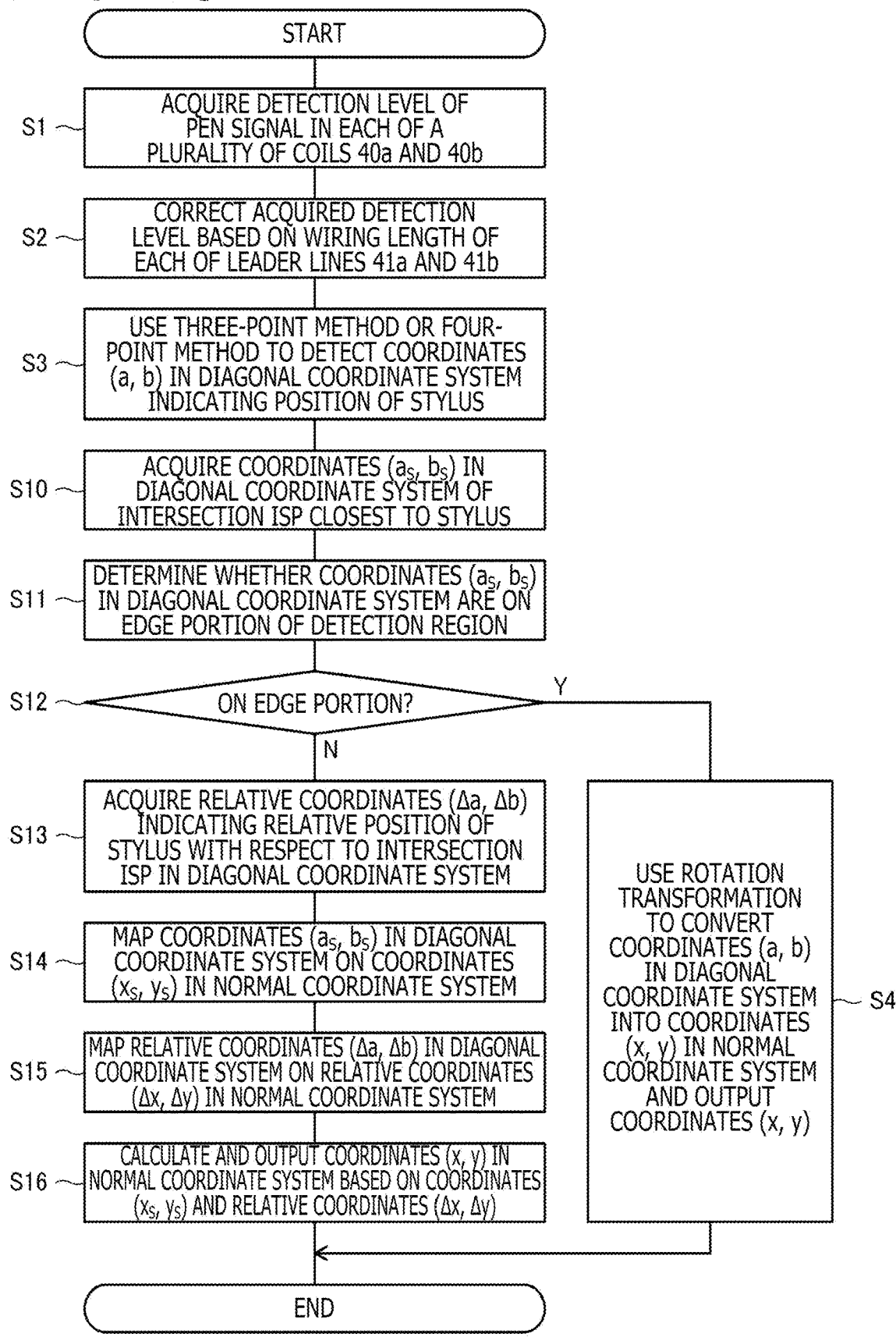
FIG. 18 is a flow chart of the position detection process performed by the integrated circuit 20 according to the third embodiment of the present disclosure.

FIG. 17 is an enlarged view of part of FIG. 15. In addition, FIG. 18 is a flow chart of the position detection process performed by the integrated circuit 20 according to the present embodiment. Hereinafter, the position detection process performed by the integrated circuit 20 according to the present embodiment will be described in detail with reference to the drawings. Note that in the following description, it is assumed that the position P illustrated in FIG. 17 is the current position of the stylus 2.

The process at S1 to S3 is as described in the first embodiment. The integrated circuit 20 that has detected the coordinates (a, b) of the position P in the diagonal coordinate system at S3 then detects an intersection ISP that is the intersection IS closest to the coordinates (a, b) and acquires coordinates ($a_s$, $b_s$) in the diagonal coordinate system (S10). Furthermore, the integrated circuit 20 refers to the intersection table to determine whether or not the acquired coordinates ($a_s$, $b_s$) are on the edge portion of the detection region T (S11 and S12). Specifically, the integrated circuit 20 determines that the coordinates ($a_s$, $b_s$) are on the edge portion of the detection region T if the edge portion flag stored in association with the coordinates ($a_s$, $b_s$) in the intersection table is "True" and determines that the coordinates ($a_s$, $b_s$) are not on the edge portion of the detection region T if the edge portion flag is "False."

If the integrated circuit 20 determines that the coordinates ($a_s$, $b_s$) are on the edge portion at S12, the integrated circuit 20 performs the rotation transformation to convert the coordinates (a, b) in the diagonal coordinate system into the coordinates (x, y) in the normal coordinate system and outputs the coordinates (x, y) to the processor as in the first embodiment (S4).

On the other hand, the integrated circuit 20 that has determined that the coordinates ($a_s$, $b_s$) are not on the edge portion at S12 first acquires relative coordinates (Δa, Δb) indicating a relative position of the stylus 2 with respect to the intersection ISP in the diagonal coordinate system (S13).

As illustrated in FIG. 17, the relative coordinate Δa corresponds to the difference between the coordinate a and the coordinate $a_s$, and the relative coordinate Δb corresponds to the difference between the coordinate b and the coordinate $b_s$.

Next, the integrated circuit 20 maps the coordinates ($a_s$, $b_s$) in the diagonal coordinate system on coordinates ($x_s$, $y_s$) in the normal coordinate system (S14). Specifically, the integrated circuit 20 refers to the intersection table illustrated in FIG. 16A to acquire the coordinates in the normal coordinate system corresponding to the coordinates ($a_s$, $b_s$) and acquires the coordinates as the coordinates ($x_s$, $y_s$). In addition, the integrated circuit 20 maps the relative coordinates (Δa, Δb) in the diagonal coordinate system on relative coordinates (Δx, Δy) in the normal coordinate system (S15). Specifically, the integrated circuit 20 refers to the difference table illustrated in FIG. 16B to acquire the relative coordinates in the normal coordinate system corresponding to the relative coordinates (Δa, Δb) and acquires the relative coordinates as the relative coordinates (Δx, Δy).

Subsequently, the integrated circuit 20 calculates the coordinates (x, y) of the position P in the normal coordinate system based on the acquired coordinates ($x_s$, $y_s$) and relative coordinates (Δx, Δy) and outputs the coordinates (x, y) to the processor (S16). Specifically, the integrated circuit 20 adds the relative coordinate Δx to the coordinate $x_s$ to acquire the X coordinate x of the position P and adds the relative coordinate Δy to the coordinate $x_s$ to acquire the Y coordinate y of the position P.

According to the present embodiment, the integrated circuit 20 can determine whether or not the position of the stylus 2 is positioned on the edge portion of the detection region T without the rotation transformation. Therefore, when the stylus 2 is positioned at the center of the detection region T, the simple method without rotation transformation (S13 to S16) can be used to convert the coordinates (a, b) in the diagonal coordinate system into the coordinates (x, y) in the normal coordinate system.

Although the preferred embodiments of the present disclosure have been described, the present disclosure is not limited to the embodiments in any way, and it is obvious that the present disclosure can be carried out in various modes without departing from the scope of the present disclosure.

For example, the integrated circuit 20 may be configured to supply different voltages or currents to the plurality of coils (the coils 40a and 40b in the first and third embodiments and the plurality of coils 50a and 50b in the second embodiment) according to the shapes (specifically, depending on whether the shape is, for example, a parallelogram, a trapezoid, or a triangle) of the plurality of coils when the integrated circuit 20 transmits the electromagnetic wave based on the EMR (registered trademark) system from the sensor 13. Specifically, the integrated circuit 20 may be configured to supply a relatively large voltage or current to the parallelogram coil, supply a relatively medium voltage or current to the trapezoid coil, and supply a relatively large voltage or current to the triangle coil. Furthermore, in another example, the integrated circuit 20 may be configured to adjust, for each coil, at least one of the voltage and the current to be supplied to each coil according to the length of each of the plurality of coils. Although the density of the generated magnetic flux may vary in each coil depending on the difference in the shape or the length of the coil even when the same voltage or current is supplied, the difference in the magnetic flux density can be suppressed according to the configuration, and the distribution of the magnetic flux density can be equalized in the end portion of the detection region T or in the entire detection region T.

Furthermore, although all of the numbers of turns of the coils 40a, 40b, 50a, and 50b are one in the embodiments, the number of turns of a relatively short coil among the coils (for example, the substantially trapezoid coil 40a illustrated in FIGS. 4 and 5) may be larger than the number of turns of a relatively long coil (for example, the substantially parallelogram coil 40a illustrated in FIGS. 4 and 5). In this way, the density of the magnetic flux generated in each coil can be uniform.

DESCRIPTION OF REFERENCE SYMBOLS

1 Tablet terminal
2 Stylus
10 Display module back surface cover
10a Opening portion of display module back surface cover 10
11 Shield plate
12 Spacer
13 Sensor
13A Substrate
16 Display panel
17 Display module frame
18 Glass
20 Integrated circuit
21 Bent substrate
22 Wiring on bent substrate 21
23 Terminal on bent substrate 21
30 to 32 Insulating layer
33 to 35 Via conductor
40a, 40b, 50a, 50b, 50a1, 50a2, 50a3, 50b1, 50b2 Coil
41a, 41b, 51a Leader line
41aa, 41ab, 41bb Partial wiring
42a, 42b, 52a Terminal of sensor 13
51a1 First section of leader line 51a
51a2 Second section of leader line 51a
51a3 Third section of leader line 51a
A1, A2 Adjustment portion
EN1, EN2 End portion
IS, ISP Intersection
L1 to L4 Wiring layer
LEa1, LEa2, LEb1, LEb2 Long-side portion
OAa, OAb Obtuse angle portion
OLa First overlapping portion
OLb Second overlapping portion
SAa, SAb Acute angle portion
SEa, SEb Short-side portion
T Detection region

The invention claimed is:
1. A sensor comprising:
a rectangle first substrate; and
an integrated circuit, wherein:
the first substrate includes:
a plurality of first coils each including a first long-side portion extending in a first direction forming a predetermined angle larger than 0 degrees and smaller than 90 degrees with respect to a long-side direction of the first substrate, and
a plurality of second coils each including a second long-side portion extending in a second direction crossing the first direction, and
the integrated circuit, in operation, supplies different voltages or currents to each of the plurality of first and second coils according to whether a shape of each of the plurality of first and second coils is a parallelogram or a trapezoid.

2. The sensor according to claim 1, wherein:
the first and second coils are formed such that an acute angle portion of the first coil and an obtuse angle portion of the second coil overlap while the sensor is viewed in plan view,
the integrated circuit is connected to wiring on a second substrate, and
the integrated circuit, in operation, supplies a current at a same time to the acute angle portion and the obtuse angle portion.

3. A sensor comprising:
a rectangle first substrate; and
an integrated circuit, wherein:
  the first substrate is provided with
    a plurality of first coils each including a first long-side portion extending in a first direction forming a predetermined angle larger than 0 degrees and smaller than 90 degrees with respect to a long-side direction of the first substrate, and
    a plurality of second coils each including a second long-side portion extending in a second direction crossing the first direction,
  the integrated circuit includes a processor and a memory storing instructions and information indicating whether each of a plurality of intersections formed by each of the plurality of first coils and each of the plurality of second coils is positioned on a center of a detection region, and
  when the processor executes the instructions stored in the memory, the processor causes the integrated circuit to:
    detect a first intersection closest to a position of a stylus among the plurality of intersections formed by each of the plurality of first coils and each of the plurality of second coils based on a level observed in each of the plurality of first and second coils, and
    determine whether the first intersection is positioned on an edge portion of the detection region based on the information stored in the memory.

4. The sensor according to claim 3, wherein:
when the processor executes the instructions stored in the memory, the processor causes the integrated circuit to:
  acquire first coordinates of the stylus in a diagonal coordinate system including the first and second directions when the integrated circuit determines that the first intersection is positioned on the edge portion of the detection region,
  acquire second coordinates indicating a relative position of the stylus with respect to the first intersection in the diagonal coordinate system,
  map third coordinates of the first intersection in the diagonal coordinate system on fourth coordinates in a normal coordinate system including the long-side direction and a short-side direction of the first substrate,
  map the second coordinates on fifth coordinates indicating a relative position of the stylus with respect to the first intersection in the normal coordinate system, and
  acquire sixth coordinates of the stylus in the normal coordinate system based on the fourth coordinates and the fifth coordinates.

* * * * *